US012208538B2

(12) United States Patent
Siccardi et al.

(10) Patent No.: US 12,208,538 B2
(45) Date of Patent: Jan. 28, 2025

(54) SHOTCRETE NOZZLE ASSEMBLY

(71) Applicant: Université Laval, Quebec (CA)

(72) Inventors: Pierre Siccardi, Quebec (CA); Marc Jolin, Quebec (CA); Thomas Jacob-Vaillancourt, Quebec (CA); Antoine Gagnon, Quebec (CA)

(73) Assignee: Université Laval, Quebec (CA)

( * ) Notice: Subject to any disclaimer, the term of this patent is extended or adjusted under 35 U.S.C. 154(b) by 710 days.

(21) Appl. No.: 17/445,542

(22) Filed: Aug. 20, 2021

(65) Prior Publication Data

US 2021/0379795 A1 Dec. 9, 2021

Related U.S. Application Data

(63) Continuation of application No. PCT/CA2020/050213, filed on Feb. 19, 2020.

(60) Provisional application No. 62/807,955, filed on Feb. 20, 2019.

(51) Int. Cl.

| | |
|---|---|
| ***B28C 5/00*** | (2006.01) |
| ***B01F 23/50*** | (2022.01) |
| ***B01F 25/314*** | (2022.01) |
| ***B01F 33/40*** | (2022.01) |
| ***B05B 7/04*** | (2006.01) |

(Continued)

(52) U.S. Cl.
CPC .............. *B28C 5/026* (2013.01); *B01F 23/54* (2022.01); *B01F 25/31424* (2022.01); *B01F 33/404* (2022.01); *B05B 7/04* (2013.01); *B28C 5/06* (2013.01)

(58) Field of Classification Search
CPC ............................. B01F 25/31424; B05B 7/04
See application file for complete search history.

(56) References Cited

U.S. PATENT DOCUMENTS

| | | | | |
|---|---|---|---|---|
| 2,984,421 A | | 5/1961 | Hession, Jr. | |
| 5,005,768 A | * | 4/1991 | Herfurth | B28C 5/026 239/417 |
| 6,065,685 A | | 5/2000 | Tschumi | |

(Continued)

FOREIGN PATENT DOCUMENTS

| | | |
|---|---|---|
| AU | 2012101447 | 11/2012 |
| CN | 201495753 | 9/2009 |

(Continued)

*Primary Examiner* — Anshu Bhatia
(74) *Attorney, Agent, or Firm* — Levine Bagade Han LLP

(57) ABSTRACT

A shotcrete nozzle assembly comprising: a tubular body including a body sidewall defining a central passageway extending along a central longitudinal passageway axis, and water dispensing bores extending through the body sidewall and including: first and second sets of water dispensing bores positioned such that outlet openings thereof defined in an inner face of the body sidewall are disposed in a respective one of longitudinally spaced-apart first and second transversal planes extending perpendicularly to the passageway axis, at least some of the water dispensing bores being oriented such that the central bore axes thereof extend in a non-radial direction relative to the passageway axis, and such that an orthogonal projection of the central bore axes of the first and second sets of water dispensing bores onto one of the transversal planes forms first and second projected central bore axes which intersect each other at a first non-zero angle.

29 Claims, 16 Drawing Sheets

(51) Int. Cl.
*B28C 5/02* (2006.01)
*B28C 5/06* (2006.01)

(56) References Cited

U.S. PATENT DOCUMENTS

| | | | |
|---|---|---|---|
| 7,854,397 | B2 | 12/2010 | Colavito et al. |
| 2021/0379796 | A1 | 12/2021 | Siccardi et al. |

FOREIGN PATENT DOCUMENTS

| | | |
|---|---|---|
| CN | 201723230 | 1/2011 |
| CN | 201940301 | 8/2011 |
| CN | 202926343 | 5/2013 |
| CN | 205243020 | 5/2016 |
| CN | 205638480 | 10/2016 |
| CN | 206199545 | 5/2017 |
| CN | 208512834 | 2/2019 |
| DE | 9001123 | 7/1991 |
| EP | 0110941 | 6/1984 |
| EP | 1570908 | 9/2005 |
| JP | 11270799 | 10/1999 |
| JP | 2001311157 | 11/2001 |
| WO | WO 2020/168425 | 8/2020 |
| WO | WO 2020/168426 | 8/2020 |

* cited by examiner

SHOTCRETE NOZZLE ASSEMBLY

CROSS-REFERENCE TO RELATED APPLICATIONS

This application is a continuation of International Patent Application No. PCT/CA2020/050213, filed Feb. 19, 2020, which claims benefit of priority to U.S. Patent Application No. 62/807,955, filed Feb. 20, 2019, the content of each of which is incorporated herein by reference in its entirety.

TECHNICAL FIELD

The technical field generally relates to shotcrete, and more specifically to shotcrete nozzles and shotcrete nozzle assemblies, as well as to methods for applying shotcrete.

BACKGROUND

Shotcrete, also called gunite or sprayed concrete, refers to fresh concrete which is propelled onto a surface at relatively high velocity. More specifically, the term "fresh concrete" refers to concrete that is substantially unhardened such that it possesses enough of its original workability that it can be placed and consolidated onto the surface. Shotcrete can be applied using different techniques. In one technique using "wet-mix" concrete, dry concrete ingredients, including but not limited to aggregate and cement, are pre-mixed with water to form the fresh concrete, which is provided through a hose to a nozzle coupled to a source of pressurized air which projects the fresh concrete from the nozzle. This technique therefore involves the storage and/or transport of fresh concrete, which may be expensive, complex, may require the use of cumbersome equipment such as a concrete mixer truck or may not be practical or possible.

In another technique known as "dry-mix" shotcrete, instead of the dry concrete ingredients being pre-mixed with water, water is mixed with the dry concrete ingredients at the nozzle to form the fresh concrete which is then propelled through the nozzle and out of the nozzle. This allows the concrete ingredients to be stored in dry form. In some instances, the concrete ingredients used in a dry-mix shotcrete process could still be pre-mixed with a relatively small quantity of water (e.g. about 3% to 5% of the total water used in the dry-mix shotcrete process) before entering the nozzle using a pre-wetting or pre-humidifying device located upstream of the nozzle.

Unfortunately, the nozzles used for dispensing dry-mix concrete may not properly mix the dry concrete ingredients with water. Furthermore, some particles of fresh concrete projected from the nozzle may not have the proper speed or energy to properly stick to the surface on which they are projected. This may cause the concrete particles to "rebound" on the surface, thereby leading to losses of material which may both be wasteful and relatively messy. Concrete particles—including both rebounded particles and sprayed particles—may further become suspended in air and thereby reduce the operator's visibility which may lead to a decrease in the quality of the work performed, as well as pose a health and/or safety risk for the operator. This may further cause concern to members of the public exposed to or witnessing concrete particles suspended in air during the application of shotcrete, which may contribute to reducing the overall social acceptability of this concrete application technique in public spaces.

SUMMARY

According to one aspect, there is provided a shotcrete nozzle assembly comprising: a tubular body having an open inlet body end, an open outlet body end and a body sidewall defining a central passageway extending between the inlet and outlet body ends along a longitudinal passageway axis centrally positioned in the central passageway, the body sidewall having an inner face facing inwardly towards the central passageway, the inlet body end being operatively connectable to a concrete source for providing dry concrete ingredients into the central passageway, the tubular body including: a water inlet defined in the body sidewall, the water inlet being operatively connectable to a water source, the water inlet being in fluid communication with the central passageway to allow water to be dispensed from the water source into the central passageway to mix the dry concrete ingredients passing in the central passageway with water to form fresh concrete; and a plurality of water dispensing bores extending through the body sidewall between the water inlet and the central passageway to allow the water to be dispensed into the central passageway, each water dispensing bore defining an outlet opening in the inner face of the body sidewall, each water dispensing bore extending along a central bore axis, the plurality of water dispensing bores including: a first set of water dispensing bores positioned such that the outlet openings thereof are spaced apart from each other and are disposed in a first bore opening transversal plane extending perpendicularly to the longitudinal passageway axis, the first set of water dispensing bores being oriented such that the central bore axes of at least a portion of the first set of water dispensing bores extend in a non-radial direction relative to the longitudinal passageway axis; and a second set of water dispensing bores positioned such that the outlet openings thereof are spaced apart from each other and are disposed in a second bore opening transversal plane spaced longitudinally from the first bore opening transversal plane and towards the outlet body end, the second set of water dispensing bores being oriented such that the central bore axes of at least a portion of the second set of water dispensing bores extend in a non-radial direction relative to the longitudinal passageway axis, and such that an orthogonal projection of the central bore axes of the first set of water dispensing bores onto one of the first and second bore opening transversal planes forms a plurality of first projected central bore axes and an orthogonal projection of the central bore axes of the second set of water dispensing bores onto the one of the first and second bore opening transversal planes forms a second plurality of projected central bore axes which intersect the first projected central bore axes at a first non-zero angle.

In at least one embodiment, each set of water dispensing bores includes a first subset of water dispensing bores and a second subset of water dispensing bores, the first and second subsets of water dispensing bores being located opposite each other across the central passageway.

In at least one embodiment, the first subset of water dispensing bores are oriented such that the central bore axes thereof extend parallel to each other.

In at least one embodiment, the second subset of water dispensing bores are oriented such that the central bore axes thereof extend parallel to each other.

In at least one embodiment, both the first and second subsets of water dispensing bores include a same number of water dispensing bores.

In at least one embodiment, each one of the first and second subsets of water dispensing bores includes three water dispensing bores.

In at least one embodiment, each water dispensing bore of the first subset of water dispensing bores is aligned with a corresponding water dispensing bore of the second subset of water dispensing bores.

In at least one embodiment, the first projected central bore axes extend perpendicular to the second projected central bore axes.

In at least one embodiment, the plurality of water dispensing bores further comprises a third set of water dispensing bores positioned such that the outlet openings thereof are spaced apart from each other and are disposed in a third bore opening transversal plane spaced longitudinally from the second bore opening transversal plane and towards the outlet body end, the third set of water dispensing bores being oriented such that the central bore axes thereof all extend in a non-radial direction relative to the longitudinal passage-way axis.

In at least one embodiment, the plurality of water dispensing bores further comprises a fourth set of water dispensing bores positioned such that the outlet openings thereof are spaced apart from each other and are disposed in a fourth bore opening transversal plane spaced longitudinally from the third bore opening transversal plane and towards the outlet body end, the fourth set of water dispensing bores being oriented such that the central bore axes thereof all extend in a non-radial direction relative to the longitudinal passage-way axis and such that an orthogonal projection of the central bore axes of the third set of water dispensing bores onto the one of the first and second bore opening transversal planes forms a plurality of third projected central bore axes and an orthogonal projection of the central bore axes of the fourth set of water dispensing bores onto the one of the first and second bore opening transversal planes forms a plurality of fourth projected central bore axes which intersect the third projected central bore axes at a second non-zero angle.

In at least one embodiment, each set of water dispensing bores includes a first subset of water dispensing bores and a second subset of water dispensing bores, the first and second subsets of water dispensing bores being located opposite each other across the central passageway.

In at least one embodiment, the third subset of water dispensing bores are oriented such that the central bore axes thereof extend parallel to each other.

In at least one embodiment, the fourth subset of water dispensing bores are oriented such that the central bore axes thereof extend parallel to each other.

In at least one embodiment, the third projected central bore axes extend perpendicular to the fourth projected central bore axes.

In at least one embodiment, all of the sets of water dispensing bores include a same number of water dispensing bores.

In at least one embodiment, each set of water dispensing bores includes six water dispensing bores.

In at least one embodiment, each water dispensing bore is oriented such that the central bore axis thereof is angled away from a corresponding bore opening transversal plane in which the outlet opening of the water dispensing bore is disposed and towards the outlet body end to allow the water dispensed through the water dispensing bores to urge the fresh concrete in the central passageway towards the outlet body end.

In at least one embodiment, at least one water dispensing bore is disposed such that the central bore axes thereof are angled away from the corresponding transversal plane at a longitudinal angle of about 15 degrees.

In at least one embodiment, the outlet openings of the water dispensing bores are oblong and are elongated in a longitudinal direction parallel to the longitudinal passageway axis.

In at least one embodiment, each water dispensing bore is cylindrical and has a diameter of between 0.5 mm and 2.5 mm.

In at least one embodiment, each water dispensing bore has a diameter of between 0.600 mm and 0.650 mm.

In at least one embodiment, the body sidewall includes an outer wall and an inner wall coaxial to the outer wall and spaced radially inwardly therefrom to define an annular chamber therebetween, the annular chamber being in communication with the water inlet and with the first and second pluralities of water dispensing bores to allow water to be dispensed from the water inlet to all the water dispensing bores.

In at least one embodiment, the tubular body includes an inner tube defining the inner wall and an outer tube defining the outer wall, the inner tube being distinct from the outer tube and being axially insertable into the outer tube.

In at least one embodiment, the tubular body further includes a plurality of annular grooves defined in the inner face of the body sidewall and extending circumferentially around the central passageway, each annular groove extending in a corresponding bore opening transversal plane such that the outlet openings of the corresponding set of water dispensing bores disposed in the corresponding bore opening transversal plane are defined in the annular groove.

In at least one embodiment, each annular groove has a depth which is comprised between 0 mm and 5 mm.

In at least one embodiment, each annular groove has a rectangular cross-section.

In at least one embodiment, each water dispensing bore has a bore diameter, and each annular groove has a width which is between 1 to 10 times the bore diameter.

In at least one embodiment, the plurality of annular grooves includes four annular grooves.

In at least one embodiment, the tubular body includes a concrete wetting section extending from the inlet body end towards the outlet body end and a stream controlling section extending from the concrete wetting section to the outlet body end, the water inlet and the water dispensing bores being defined in the concrete wetting section.

In at least one embodiment, the stream controlling section includes at least one helicoidal conduit defined within the body sidewall, each helicoidal conduit extending helicoidally around the central conduit between an air inlet end and an air outlet end coinciding with the outlet body end, the air inlet end being operatively connectable to a pressurized air source to force air through the helicoidal conduit, the helicoidal conduit being twisted around the central passageway to guide the pressurized air exiting through the air outlet end in an helicoidal airflow extending out from the outlet body end and twisting around the stream of fresh concrete exiting the outlet body end to thereby accelerate a plurality of fresh concrete particles located in an outer layer of the stream of fresh concrete.

In at least one embodiment, the tubular body includes a nozzle connecting portion located at the open inlet body end, the nozzle connecting portion being connectable to a hose connector se-cured to a dry concrete ingredients dispensing hose operatively coupled to the concrete source.

In at least one embodiment, the assembly further comprises a hose connector securable to a dry concrete ingredients dispensing hose operatively coupled to the concrete source, the tubular body including a nozzle connecting portion located at the open inlet body end and connectable with the hose connector.

In at least one embodiment, the nozzle connecting portion includes a circumferential outer groove and wherein the hose connector includes a female cam fitting collar sized and shaped to be coaxially inserted over the nozzle connecting portion, the female cam fitting collar including at least one pivotable cam member selectively movable between a locked position in which the at least one pivotable cam member engages the circumferential outer groove to prevent axial movement of the female cam fitting collar relative to the tubular body and an unlocked position in which the at least one pivotable cam member is clear from the circumferential outer groove to allow the female cam fitting collar to be removed from the tubular body.

According to yet another aspect, there is also provided a shotcrete nozzle assembly comprising: a tubular body having an open inlet body end, an open outlet body end and a body sidewall defining a central passageway extending between the inlet and outlet body ends along a longitudinal passageway axis centrally positioned in the central passageway, the body sidewall having an inner face facing inwardly towards the central passageway, the inlet body end being operatively connectable to a concrete source for providing dry concrete ingredients into the central passageway, the tubular body including: a concrete wetting section extending from the inlet body end towards the outlet body end, the concrete wetting section including: a water inlet defined in the body sidewall, the water inlet being operatively connectable to a water source, the water inlet being in fluid communication with the central passageway to allow water to be dispensed from the water source into the central passageway to mix the dry concrete ingredients passing in the central passageway with water to form fresh concrete; a plurality of water dispensing bores extending through the body sidewall between the water inlet and the central passageway to allow the water to be dispensed into the central passageway, each water dispensing bore defining an outlet opening in the inner face of the body sidewall, each water dispensing bore extending along a central bore axis, the plurality of water dispensing bores including: a first set of water dispensing bores positioned such that the outlet openings thereof are spaced apart from each other and are disposed in a first bore opening transversal plane extending perpendicularly to the longitudinal passageway axis, the first set of water dispensing bores being oriented such that the central bore axes thereof all extend in a non-radial direction relative to the longitudinal passageway axis; and a second set of water dispensing bores positioned such that the outlet openings thereof are spaced apart from each other and are disposed in a second bore opening transversal plane spaced longitudinally from the first bore opening transversal plane and towards the outlet body end, the second set of water dispensing bores being oriented such that the central bore axes thereof all extend in a non-radial direction relative to the longitudinal passageway axis, and such that an orthogonal projection of the central bore axes of the first set of water dispensing bores onto one of the first and second bore opening transversal planes forms a plurality of first projected central bore axes and an orthogonal projection of the central bore axes of the second set of water dispensing bores onto the one of the first and second bore opening transversal planes forms a second plurality of projected central bore axes which intersect the first projected central bore axes at a first non-zero angle; and a stream controlling section extending from the concrete wetting section to the outlet body end, the stream controlling section including at least one helicoidal conduit defined within the body sidewall, each helicoidal conduit extending helicoidally around the central conduit between an air inlet end and an air outlet end coinciding with the outlet body end, the air inlet end being operatively connectable to a pressurized air source to force air through the helicoidal conduit, the helicoidal conduit being twisted around the central passageway to guide the pressurized air exiting through the air outlet end in an helicoidal airflow extending out from the outlet body end and twisting around the stream of fresh concrete exiting the outlet body end to thereby accelerate a plurality of fresh concrete particles located in an outer layer of the stream of fresh concrete.

DETAILED DESCRIPTION

Figure 1:
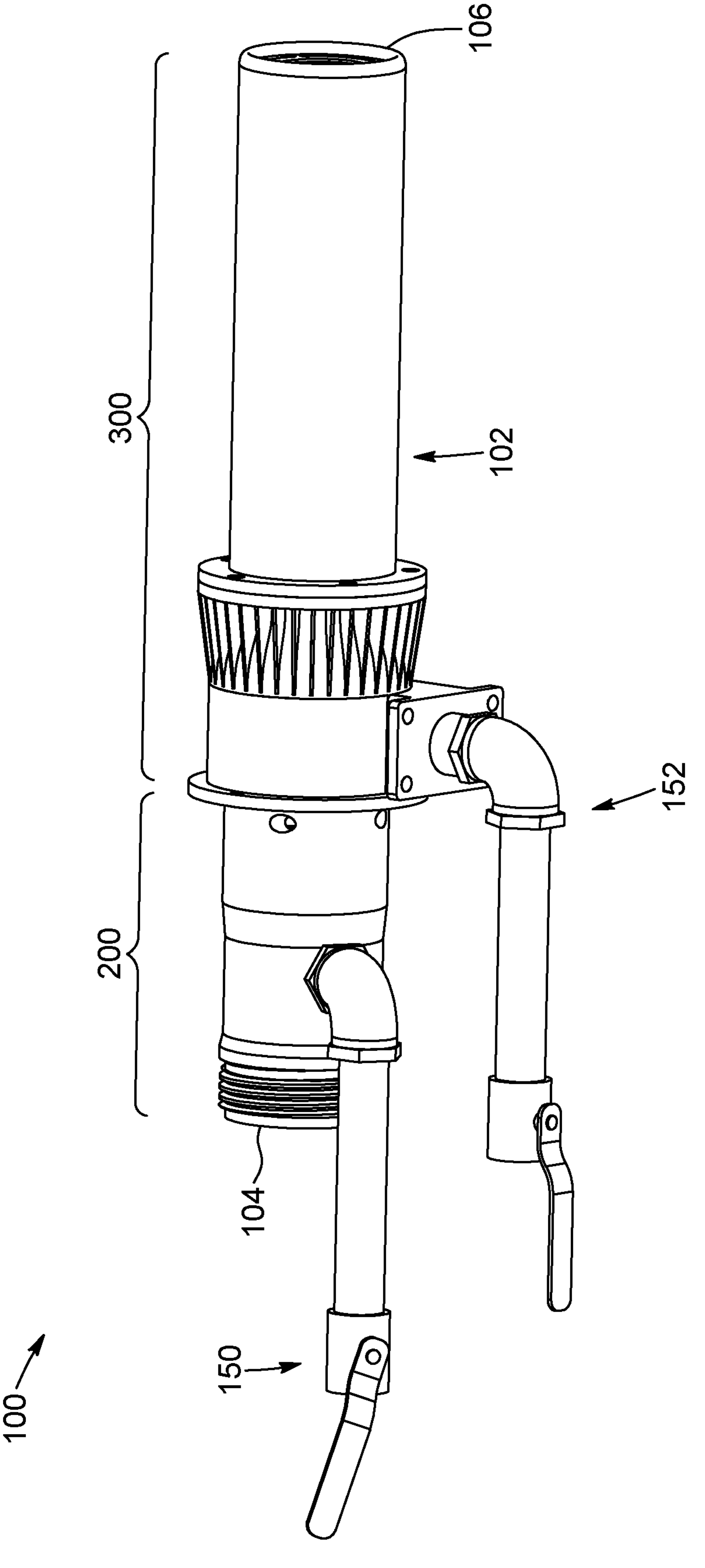
FIG. 1 is a perspective view of a shotcrete nozzle assembly, in accordance with one embodiment, with a water control valve and an air control valve operatively connected to the assembly.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

For the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Moreover, it will be understood that the terms "longitudinal" and "longitudinally" are used herein as a positional term in reference to a longitudinal passageway axis of a central passageway of a shotcrete nozzle assembly's tubular body. It will thus further be understood that the terms "transverse" and "transversely" refer to a direction which is generally orthogonal (i.e. normal) to the longitudinal passageway axis.

Furthermore, it will also be understood that the term "orthogonal projection" of an axis on a plane refers to the projection of the axis along projection lines which are parallel to each other and which are perpendicular to the plane on which the axis is projected. Therefore, if an axis is angled away from a projection plane and is said to be projected on the projection plane to form a projected axis, then the projected axis extends in the projection plane.

Referring to FIG. 1, there is shown a shotcrete nozzle assembly 100, in accordance with one embodiment.

In the illustrated embodiment, the shotcrete nozzle assembly 100 includes a tubular body 102 which extends between an open inlet body end 104 and an open outlet body end 106. The inlet body end 104 is adapted to be operatively connected to a substantially dry concrete source, not shown, to provide dry concrete ingredients, such as aggregate and cement, into the body 102 through the inlet body end 104. Once the dry concrete ingredients have been mixed with water inside the body 102 to thereby form fresh concrete, the concrete source is further adapted to force the fresh concrete through the body 102 and out the outlet body end 106 to be projected onto a surface.

In one embodiment, the substantially dry concrete source is configured for providing dry concrete ingredients which include less than 10 wt % of water into the body 102. It will however be understood that the assembly 100 is not limited for use with substantially dry concrete ingredients and that the concrete source could instead be configured for providing substantially fresh concrete, i.e. concrete which includes at least 10 wt % of water into the body 102.

In the illustrated embodiment, the tubular body 102 includes a concrete wetting section 200 for mixing the concrete ingredients provided by the concrete source with water as they pass through the tubular body 102 and a stream controlling section 300 for controlling a stream of fresh concrete projected from the outlet body end 106.

More specifically, the concrete wetting section 200 is adapted to be operatively connected to a water source, not shown, via a water control valve 150 which allows a user to control a debit and/or pressure of the water being provided into the tubular body 102 to be mixed with the concrete ingredients to form fresh concrete. It is appreciated that, in an alternative embodiment (not shown), the shotcrete nozzle assembly 100 can be free of water control valve 150. For instance, the water flowrate and pressure in the shotcrete nozzle assembly 100 can be adjusted and controlled through another actuator such as and without being limitative a variable speed pump.

In the illustrated embodiment, the stream controlling section 300 is adapted to be operatively connected to a pressurized air source, not shown, to provide air to the stream controlling section 300 of the tubular body 102. The stream controlling section 300 is adapted to guide the air along a helicoidal path to as to form an helicoidal airflow around the stream of fresh concrete projected from the outlet body end 106 to reduce rebound of fresh concrete on the surface on which it is projected, as will be further explained below.

In the illustrated embodiment, the stream controlling section 300 is adapted to be operatively connected to the pressurized air source via an air control valve 152 which allows a user to control a debit and/or pressure of the air being provided into the tubular body 102. As for the water control valve 150, it is appreciated that, in an alternative embodiment (not shown), the shotcrete nozzle assembly 100 can be free of air control valve 152. For instance, the air flowrate and pressure in the shotcrete nozzle assembly 100 can be adjusted and controlled through another actuator such as and without being limitative a variable speed pressurized air supply.

Alternatively, instead of being provided as separate components which are connected to the tubular body, the water control valve 150 and the air control valve 152, or any other suitable water and air control actuators, could instead be integrated within the tubular body 102.

In the illustrated embodiment, the concrete wetting section 200 and the stream controlling section 300 are provided as two distinct components which are assembled together end-to-end to form the tubular body 102. It will however be understood that the concrete wetting section 200 and the stream controlling section 300 could instead be integrally formed together such that the tubular body 102 defines a single, unitary component.

Figure 2:
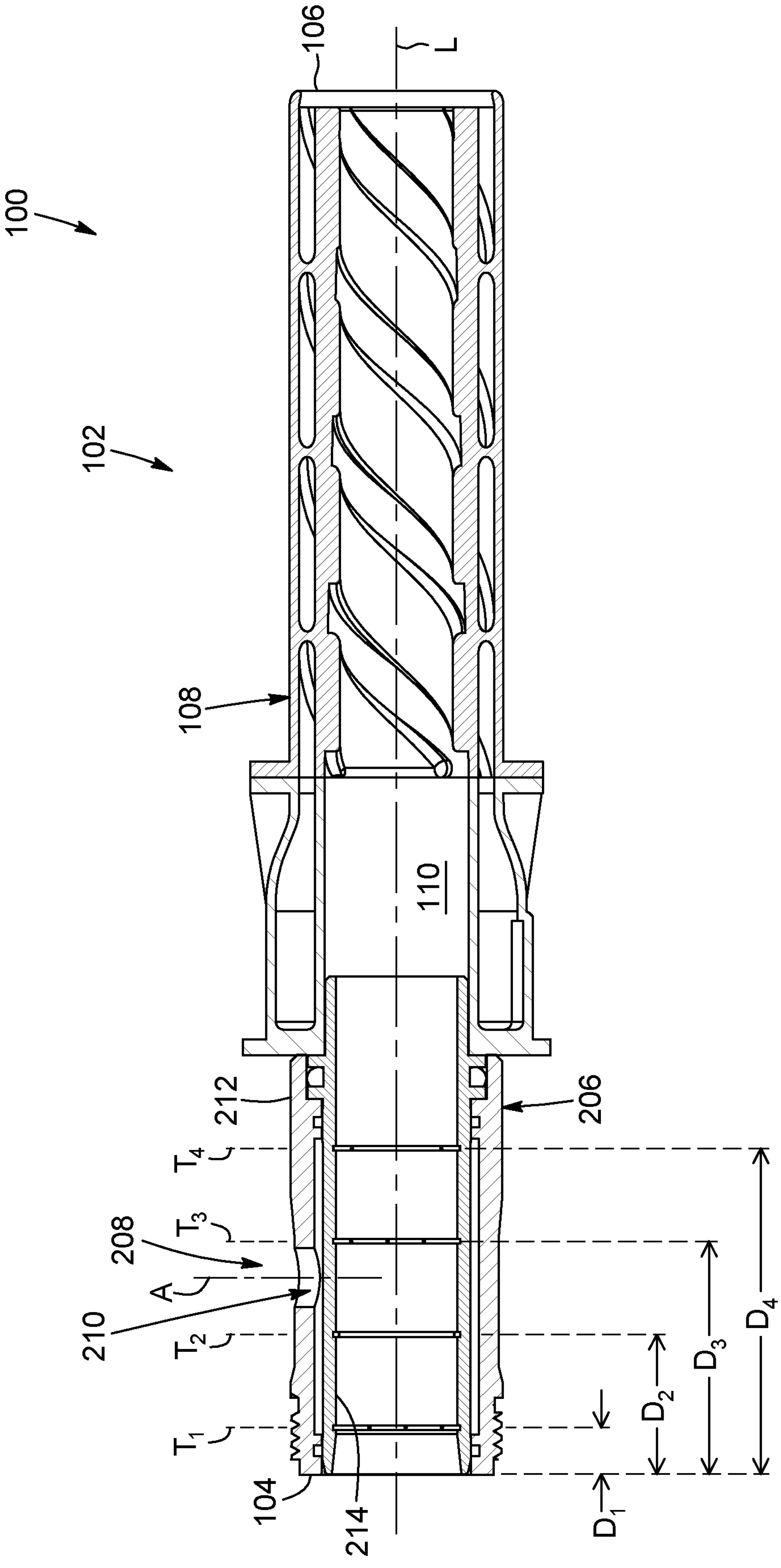
FIG. 2 is a longitudinal cross-section view of the shotcrete nozzle assembly illustrated in FIG. 1.
Figure 3:
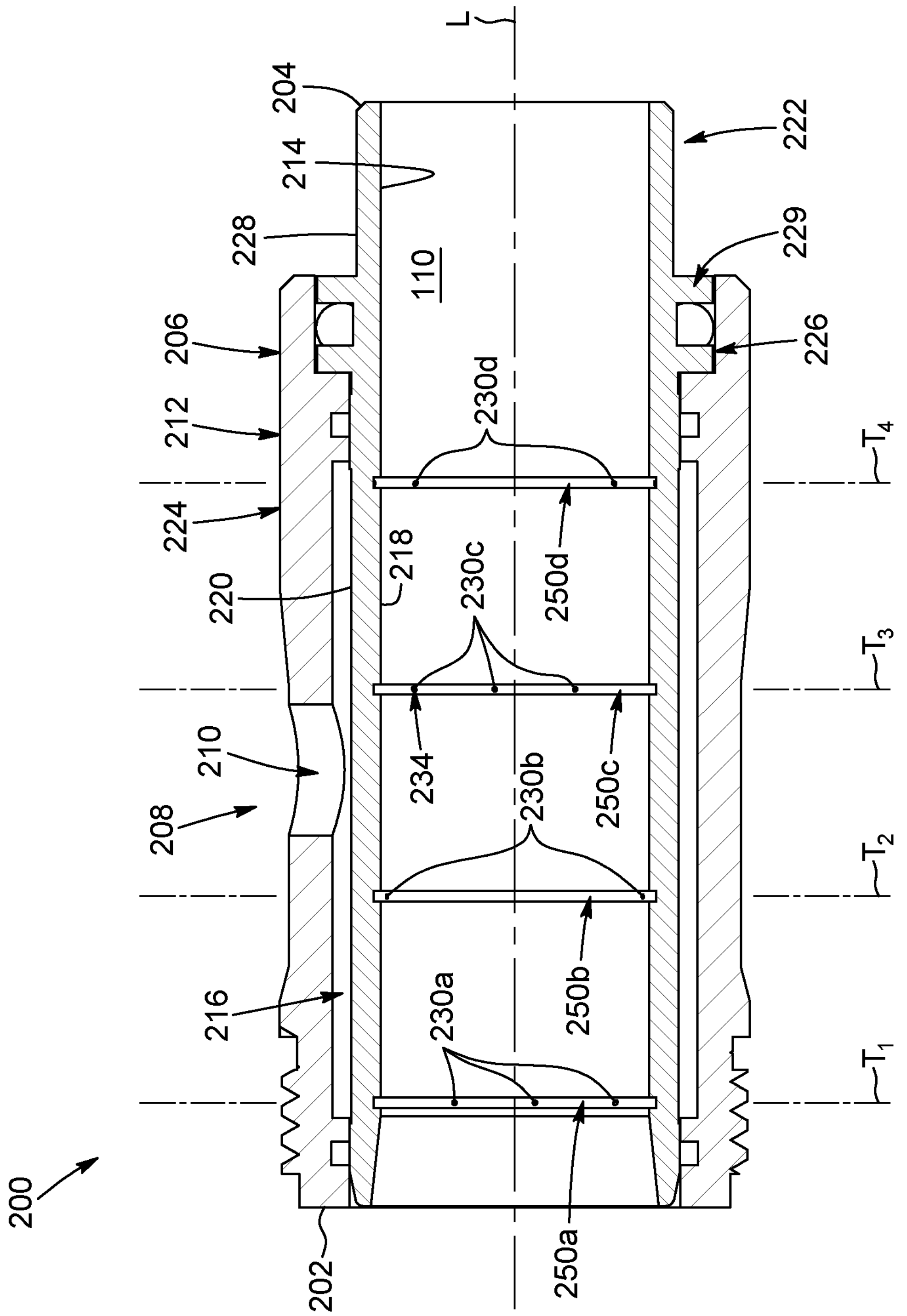
FIG. 3 is a longitudinal cross-section view of a concrete wetting section of the shotcrete nozzle assembly illustrated in FIG. 1.
Figure 4A:
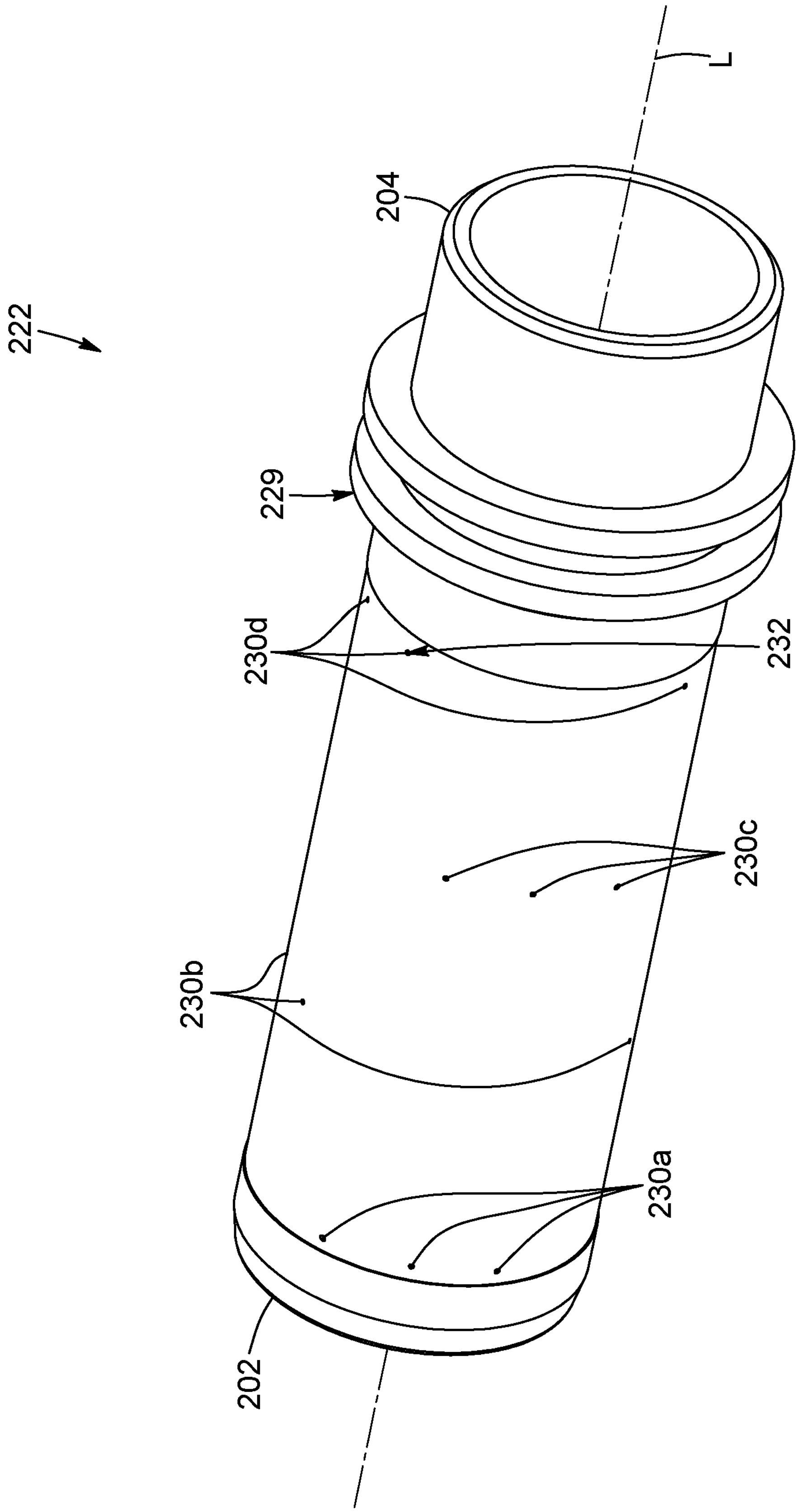
FIG. 4A is a top perspective view of an inner tube for the concrete wetting section illustrated in FIG. 3.
Figure 4B:
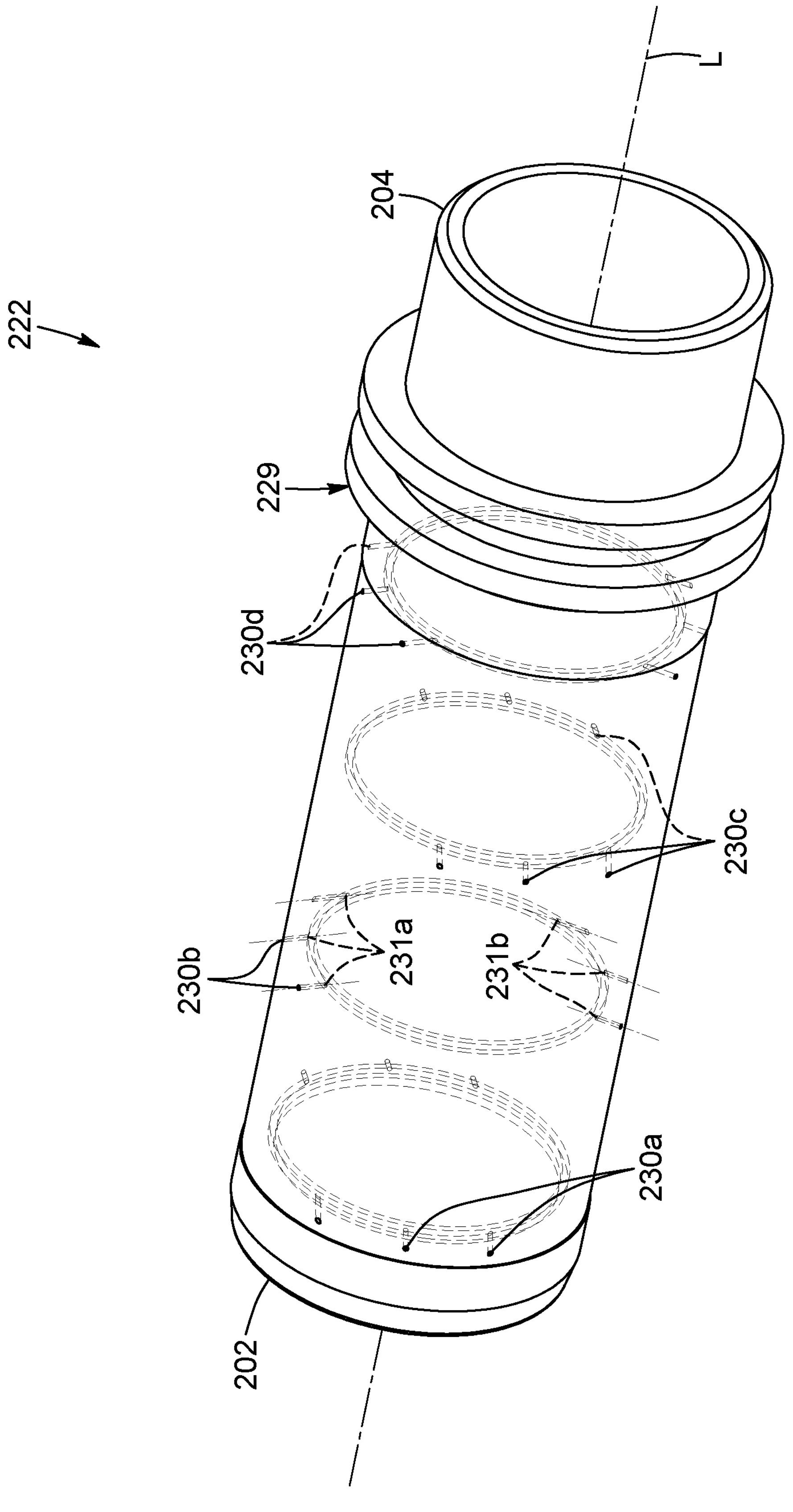
FIG. 4B is another top perspective view of an inner tube for the concrete wetting section illustrated in FIG. 3, with the outline of water dispensing bores extending through the inner tube's sidewall and of annular grooves defined inside the inner tube shown in broken lines.

Turning now to FIGS. 2 to 6B, the tubular body 102 includes a body sidewall 108 which extends from the inlet body end 104 to the outlet body end 106 and which defines a central passageway 110 to allow the concrete to pass from the inlet body end 104 to the outlet body end 106. As shown in FIG. 2, the central passageway 110 is generally straight and extends along a longitudinal passageway axis L positioned centrally within the central passageway 110.

The concrete wetting section 200 extends from the inlet body end 104 towards the outlet body end 106. Specifically, the concrete wetting section 200 extends between a first end 202 corresponding to the inlet body end 104 of the tubular body 102 and a second end 204 spaced longitudinally from the first end 202 towards the outlet body end 106. The body sidewall 108 further includes a wetting sidewall section 206 which extends along the concrete wetting section 200 between the first and second ends 202, 204 of the concrete wetting section 200.

The concrete wetting section 200 includes a water inlet 208 operatively connectable to the water source to allow the water to be dispensed into the central passageway 110. In the illustrated embodiment, the water inlet 208 is connectable to the water control valve 150 which it itself connected to the water source, as explained above, but could instead be configured to be connected directly to the water source.

In the illustrated embodiment, the water inlet 208 includes a circular inlet opening 210 which is defined in the wetting sidewall section 206 of the body sidewall 108 and which defines an inlet axis A extending substantially orthogonally to the longitudinal passageway axis L.

In the illustrated embodiment, the concrete wetting section 200 is double-walled. More specifically, the wetting sidewall section 206 includes an outer wall 212 and an inner wall 214 which is coaxially disposed within the outer wall 212. The inner wall 214 is spaced radially inwardly from the outer wall 212 to define an interstitial annular chamber 216 between the outer and inner walls 212, 214. The annular chamber 216 is in fluid communication with the inlet member 210 such that the water provided by the water source is dispensed from the water source into the annular chamber 216 through the circular inlet opening 210.

The circular inlet opening 210 may be operatively connectable to the water control valve 150 using an intermediate pipe extending between the air control valve 152 and the circular inlet opening 210. The intermediate pipe could include an externally threaded end surface and the circular inlet opening 210 could include a corresponding inner threaded surface sized and shaped to engage the externally threaded end surface of the intermediate pipe. Alternatively, the intermediate pipe could instead be welded to the wetting sidewall section 206, or be secured to the wetting sidewall section 206 using any another securing technique that a skilled person would consider to be suitable.

As shown in FIG. 2, the inner wall 214 has an inner face 218 which faces inwardly towards the central passageway 110 and delimits the same, and an outer face 220 which faces radially outwardly from the central passageway 110 and towards the annular chamber 216 and delimits inwardly the same.

In the illustrated embodiment, the concrete wetting section 200 is made of two distinct portions: an inner tube 222 which defines the inner wall 214 and an outer tube 224 which defines the outer wall 212. More specifically, the outer tube 224 includes an inner annular recess 226 extending from the second end 204 towards the first end 202 of the concrete wetting section 200. The inner tube 222 includes an end portion 228 extending from the second end 204 towards the first end 202 of the concrete wetting section 200 and an enlarged diameter portion 229 which extends from the end portion 228 towards the first end 202 of the concrete wetting section 200. The enlarged diameter portion 229 extends radially outwardly from the outer face 220 and is sized and shaped to be snuggly received in inner annular recess 226 of the outer tube 224. This configuration allows the inner tube 222 to be slidably inserted axially into the outer tube 224 from the second end 204 towards the first end 202 of the concrete wetting section 200. In the illustrated embodiment, the inner and outer tubes 222, 224 are secured together using one or more locking pins, not shown, which are inserted through corresponding openings in the inner and outer tubes 222, 224 to prevent further movement of the inner and outer tubes 222, 224 relative to each other. Alternatively, the outer tube 224 may further be secured to the inner tube 222 using corresponding threaded portions threadably engaging each other, with one or more fasteners or using other securing techniques such as welding or the like.

Still referring to FIGS. 2 to 6B, the concrete wetting section 200 further includes a plurality of water dispensing bores 230 extending through the body sidewall 108 between the water inlet 208 and the central passageway 110 to dispense the water provided through the water inlet 208 into the central passageway 110. Specifically, each water dispensing bore 230 includes an inlet opening 232 defined in the outer face 220 of the inner tube 222, an outlet opening 234 defined in the inner face 218 of the inner tube 222 and a central bore segment 235 extending between the inlet and outlet openings 232, 234. The inlet opening 232 allows fluid communication between the annular chamber 216 and the central bore segment 235 and the outlet opening 234 allows fluid communication between the central bore segment 235 and the central passageway 110.

It will be appreciated that this configuration allows all the water dispensing bores 230 to be in fluid communication with the annular chamber 216, which thereby acts as a manifold to dispense water from a single water inlet to multiple water dispensing bores. The water is further provided to the water dispensing bores 230 from the water source through the water inlet 208 with a certain pressure such that the water is projected into the central passageway 110 from each water dispensing bore 230. More specifically, each water dispensing bore 230 is elongated and extends along a central bore axis B, best shown in FIG. 6B. The water is projected into the central passageway 110 through the outlet opening 234 and generally linearly along the central bore axis B.

In the illustrated embodiment, the water dispensing bores 230 are sized and shaped to atomize the water provided through the water dispensing bores 230 into a substantially fine mist containing water droplets having a substantially small size. This may contribute to further improve the mixing of the dry concrete ingredients with the water as it passes through the concrete wetting section 200. In one embodiment, each water dispensing bore 230 has a diameter of between 0.5 mm and 2.5 mm, and more specifically of between about 0.600 mm and 0.650 mm, and even more specifically of about 0.635 mm, which allows the water dispensed through the bore 230 to be substantially atomized.

In this embodiment, the water is therefore projected as a water spray of atomized water into the central passageway 110. The water spray could be generally cylindrical or could be generally conical and expand as it exits the outlet opening 234. Regardless of its shape, the water spray is still projected along the central bore axis B, such that the central bore axis B extends generally at a center of the water spray.

In the illustrated embodiment, the water dispensing bores 230 are disposed such that the water sprays formed by the water dispensing bores 230 provide the water to the dry concrete ingredients relatively uniformly across the entire cross-section of the central passageway 110 as the dry concrete ingredients pass from the first end 202 to the second end 204 of the concrete wetting section 200. More specifically, the water dispensing bores 230 include first, second, third and fourth sets of water dispensing bores 230*a*, 230*b*, 230*c*, 230*d*. For each set of water dispensing bores 230*a*, 230*b*, 230*c*, 230*d*, the outlet opening 234 of the water dispensing bores 230 are disposed along a corresponding bore opening transversal plane extending orthogonally to the longitudinal passageway axis L, and each bore opening transversal plane is disposed at a certain longitudinal location along the concrete wetting section 200, i.e. each one of the sets of water dispensing bores 230*a*, 230*b*, 230*c*, 230*d* is spaced-apart from adjacent ones of the sets of water dispensing bores 230*a*, 230*b*, 230*c*, 230*d* along the longitudinal passageway axis L.

In the illustrated embodiment, the outlet openings 234 of the first set of water dispensing bores 230*a* are disposed in a first bore opening transversal plane T1 which is spaced longitudinally from the inlet body end 104 towards the outlet body end 106. Similarly, the outlet openings 234 of the second set of water dispensing bores 230*b* are disposed in a second bore opening transversal plane T2 spaced longitudinally from the first bore opening transversal plane T1 towards the outlet body end 106, the outlet openings 234 of the third set of water dispensing bores 230*c* are disposed in a third bore opening transversal plane T3 spaced longitudinally from the second bore opening transversal plane T2 towards the outlet body end 106 and the outlet openings 234 of the fourth set of water dispensing bores 230*d* are disposed in a fourth bore opening transversal plane T4 spaced longitudinally from the third bore opening transversal plane T3 towards the outlet body end 106.

The first bore opening transversal plane T1 is therefore spaced longitudinally from the inlet body end 104 by a first longitudinal distance D1, the second bore opening transversal plane T2 is spaced longitudinally from the inlet body end 104 by a second longitudinal distance D2 which is greater than the first longitudinal distance D1, the third bore opening transversal plane T3 is spaced longitudinally from the inlet body end 104 by a third longitudinal distance D3 which is greater than the second longitudinal distance D2 and the fourth bore opening transversal plane T4 is spaced longitudinally from the inlet body end 104 by a fourth longitudinal distance D4 which is greater than the third longitudinal distance D3.

Still in the illustrated embodiment, the first longitudinal distance D1 is between about 0.600 inches and 0.650 inches (i.e. between about 15.24 mm and 16.51 mm), the second longitudinal distance D2 is between about 1.775 inches and 1.825 inches (i.e. between about 45.09 mm and 46.36 mm), the third longitudinal distance D3 is between about 2.950 inches and 3 inches (i.e. between about 74.93 mm and 76.20 mm) and the fourth longitudinal distance D4 is between about 4.150 inches and 4.200 inches (i.e. between about 105.41 mm and 106.68 mm). Alternatively, the transversal planes T1, T2, T3, T4 could be disposed at different longitudinal locations along the concrete wetting section 200 such that the longitudinal distances D1, D2, D3, D4 are different.

As water is dispensed from the water source and through the annular chamber 216 at a certain water pressure, which could be predetermined or could be selectively adjusted using the water control valve 150 or other water pressure adjusting mechanism, each water dispensing bore 230 creates a corresponding water spray which is projected from the water dispensing bore 230 into the central passageway 110.

Figure 5:
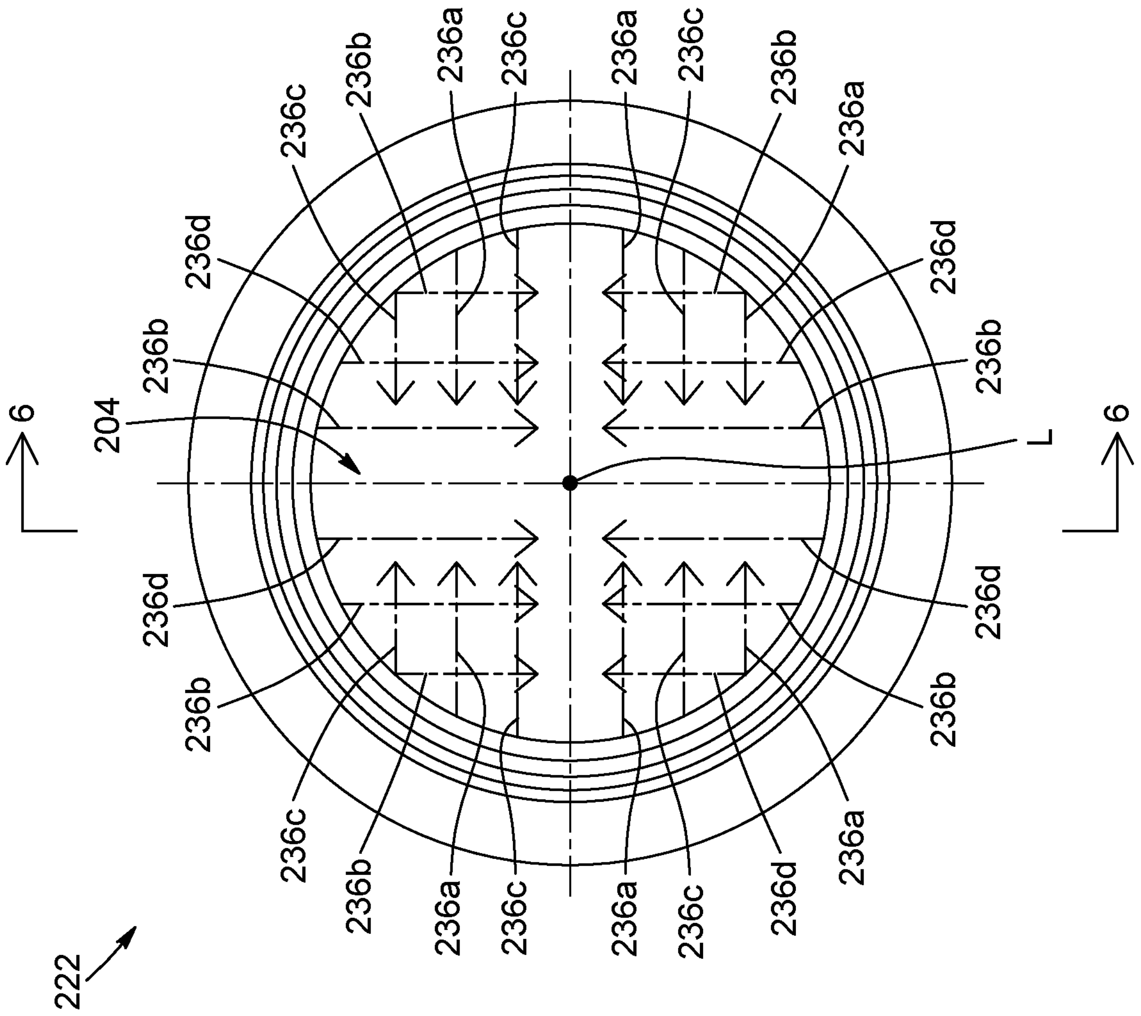
FIG. 5 is an end elevation view of the inner tube illustrated in FIG. 4, showing projected central bore axes formed by an orthogonal projection of the central bore axes on a transversal plane.

In the illustrated embodiment, as shown in FIG. 5, the water dispensing bores 230 in each set of water dispensing bores 230*a*, 230*b*, 230*c*, 230*d* are oriented relative to each other such that their central bore axes B all extend in a non-radial direction relative to a center of the central passageway 110, i.e. the centrally-extending longitudinal passageway axis L. In other words, instead of being oriented towards the centrally-extending longitudinal passageway axis L and intersecting the centrally-extending longitudinal passageway axis L (thereby substantially defining radii of the central passageway 110), the central bore axes B of the water dispensing bores 230 are all substantially spaced from and non-intersecting with the centrally-extending longitudinal passageway axis L.

It has been found that this configuration unexpectedly improves the ability of the concrete wetting section 200 to mix the dry concrete ingredients passing therethrough with water relatively uniformly compared to other wetting devices comprising water dispensing bores which form water sprays or water jets that are all oriented radially towards a central longitudinal axis of the central passageway.

In the illustrated embodiment, each set of water dispensing bores 230*a*, 230*b*, 230*c*, 230*d* includes first and second subsets of water dispensing bores 231*a*, 231*b* which are located opposite each other across the central passageway 110. This configuration allows the dry concrete ingredients to be wetted from opposite sides as it passes through each bore opening transversal planes T1, T2, T3, T4.

In the illustrated embodiment, the first and second subsets of water dispensing bores 231*a*, 231*b* include a same number of water dispensing bores 230. Specifically, both the first and second subsets of water dispensing bores 231*a*, 231*b* include three spaced-apart dispensing bores 230. Each set of water dispensing bores 230*a*, 230*b*, 230*c*, 230*d* therefore includes six water dispensing bores 230, for a total of 24 water dispensing bores 230 for all four sets of water dispensing bores 230*a*, 230*b*, 230*c*, 230*d.*

Alternatively, the first and second subsets of water dispensing bores 231*a*, 231*b* could include less or more than three spaced-apart water dispensing bores 230. In yet another embodiment, the first subset of water dispensing bores 231*a* may not include the same number of water dispensing bores 230 as the second subset of water dispensing bores 231*b*. In yet another embodiment, instead of being divided into two subsets, all water dispensing bores 230 could be disposed side-by-side and project water into the central passageway 110 in the same direction. In yet another embodiment, instead of comprising two subsets of water dispensing bores, the plurality of water dispensing bores 230 could instead be divided into more than two subsets, with each subset being spaced from adjacent subset around a circumference of the central passageway 110.

In the illustrated embodiment, the water dispensing bores 230 in each subset of water dispensing bores 231*a*, 231*b* are spaced from each other in a transversal direction across the central passageway 110 and are oriented relative to each other such that their central bore axes B all extend substantially parallel to each other. It will be understood that the term "substantially parallel" as used hereinabove means that the central bore axes B of the water dispensing bores 230 in each subset of water dispensing bores 231*a*, 231*b* may not be exactly parallel to each other, but may instead be slightly angled relative to each other. In other words, the water dispensing bores 230 could be oriented such that their central bore axes B are angled relative to each other by a relatively small tolerance within which a skilled person would still consider that the central bore axes B of the water dispensing bores 230 in each subset of water dispensing bores 231*a*, 231*b* are parallel to each other.

Figure 6A:
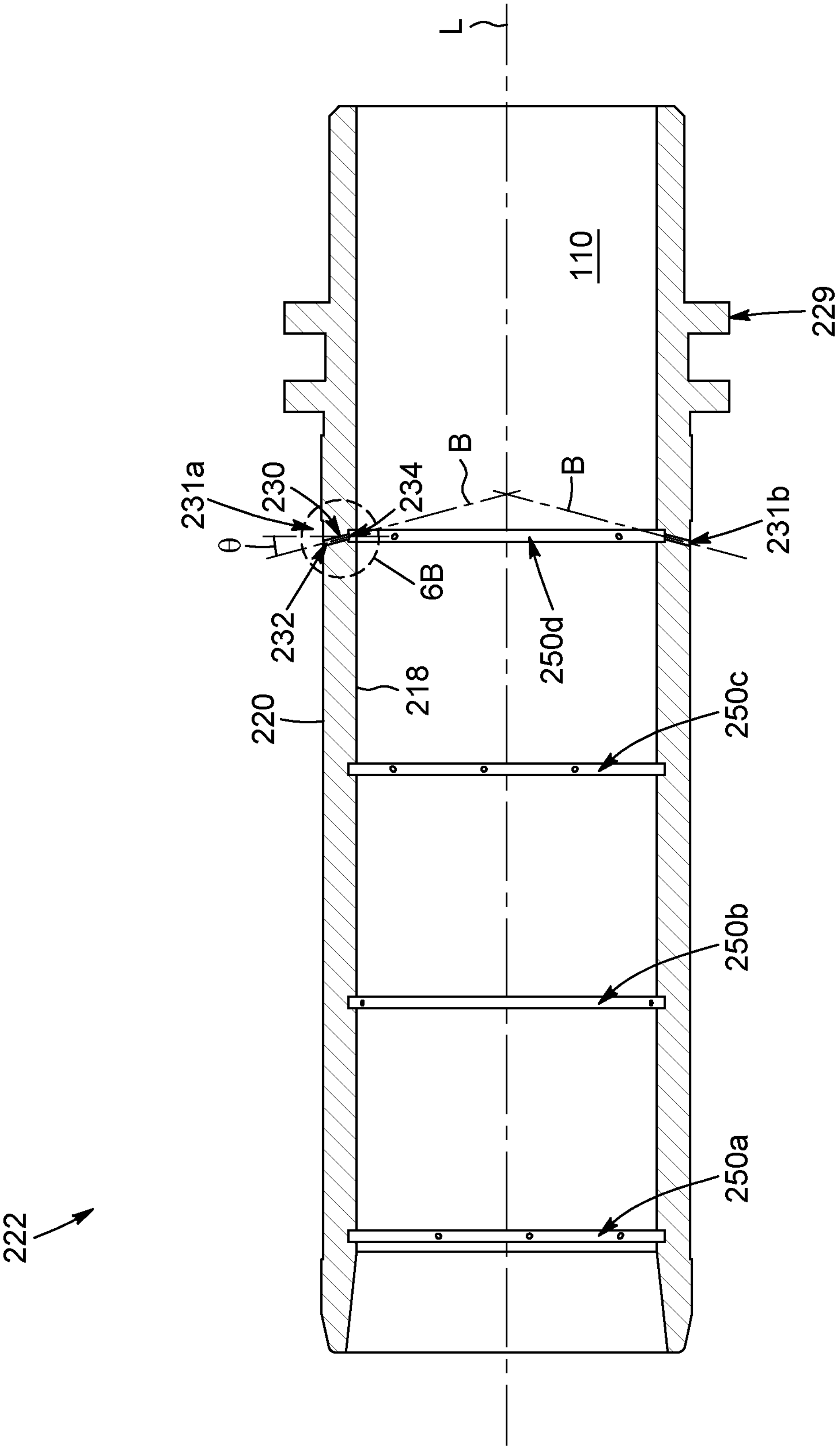
FIG. 6A is a longitudinal cross-section view of the inner tube illustrated in FIG. 4.
Figure 6B:
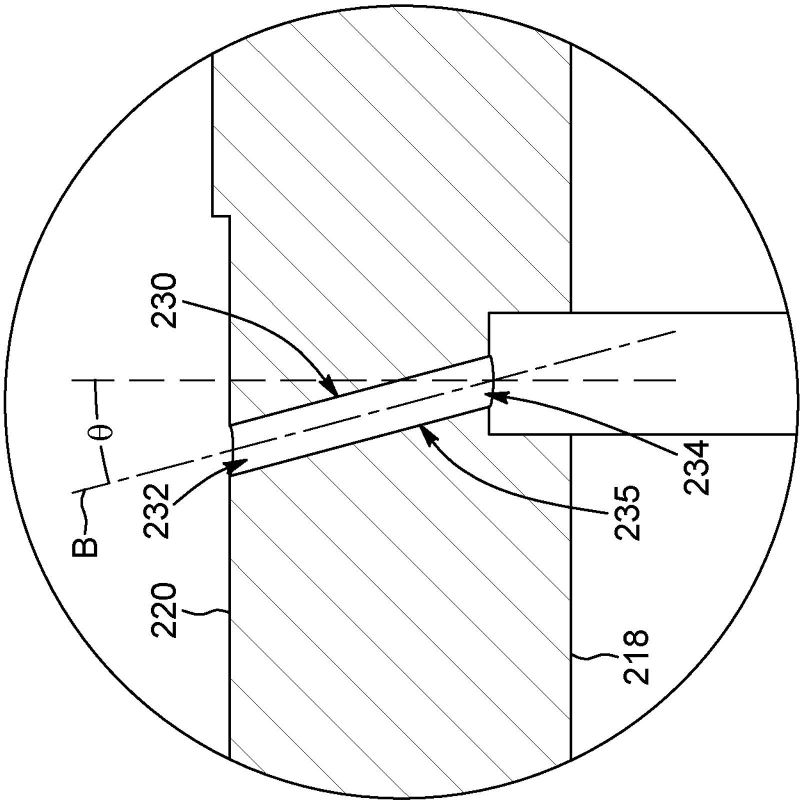
FIG. 6B is an enlarged portion of the longitudinal cross-section view of the inner tube illustrated in FIG. 6A.

In the illustrated embodiment, as shown in FIGS. 6A and 6B, the water dispensing bores 230 are oriented such that their central bore axes B do not extend orthogonally to the longitudinal passageway axis L. In other words, the water dispensing bores 230 are not oriented such that their central bore axes B extend in the corresponding bore opening transversal plane T1, T2, T3 or T4 in which their outlet opening 234 are disposed. Instead, the water dispensing bores 230 are oriented such that the central bore axes B are angled away from the corresponding bore opening transversal plane T1, T2, T3 or T4 and longitudinally towards the outlet body end 106. More specifically, the central bores axes B of the water dispensing bores 230 are angled by a longitudinal angle θ such that their inlet ends 232 are located towards the inlet body end 104 with respect to their outlet ends 234, which are located towards the outlet body end 106. In this configuration, the pressure from the water sprays projected from the water dispensing bores 230 may contribute to further urge the fresh concrete in the central passageway 110 towards the outlet body end 106.

In one embodiment, the longitudinal angle θ is about 15 degrees relative to the corresponding bore opening transversal plane T1, T2, T3, T4 of the water dispensing bore 230. Alternatively, the longitudinal angle θ could be any angle between 10 degrees and 60 degrees, or could be any other angle which a skilled person would consider to be appropriate. In yet another embodiment, the water dispensing bores 230 may not be angled longitudinally, and may instead be oriented such that their central bore axis B extends orthogonally relative to the longitudinal passageway axis L, i.e. in the corresponding bore opening transversal plane T1, T2, T3 or T4.

In the illustrated embodiment, each water dispensing bore 230 is generally cylindrical. It will be understood that since the water dispensing bores 230 are angled longitudinally towards the outlet body end 106, the outlet openings 234 of the water dispensing bores 230 are not perfectly circular as they would be if the water dispensing bore 230 were oriented such that their central bore axis B was orthogonal to the longitudinal passageway axis L, but are instead generally oblong. More specifically, the water dispensing bores 230 are elongated in a longitudinal direction parallel to the longitudinal passageway axis L. Alternatively, the outlet openings 234 may not be oblong. In yet another embodiment, the water dispensing bores 230 may not be cylindrical and could instead be shaped differently.

As best shown in FIG. 6A, the central bore axes B of the first subset of water dispensing bores 231*a* and the central bore axes B of the second subset of water dispensing bores 231*b* are substantially mirror images of each other across the longitudinal passageway axis L of the central passageway 110. In this embodiment, the first and second subsets of water dispensing bores 231*a*, 213*b* are therefore not parallel to each other. Instead, the first and second subsets of water dispensing bores 231*a*, 213*b* are aligned with each other across the central passageway 110. In this configuration, if the central bore axes B of the first and second subsets of water dispensing bores 231*a*, 213*b* were projected onto one of the bore opening transversal plane T1, T2, T3 or T4 to form on the bore opening transversal plane a plurality of projected central bore axes corresponding to the central bore axes B, then the central bore axes B of the first subset of water dispensing bores 231*a* would coincide with the central bore axes B of the second subset of water dispensing bores 231*b*. The projected central bore axes for each set of water dispensing bores 230*a*, 230*b*, 230*c*, 230*d* would therefore all be parallel to each other.

FIG. 5 shows the inner tube 222 viewed from the second end 204 of the concrete wetting section 200 and looking towards the first end 202. From this viewpoint, the central bore axes B appear as if orthogonally projected on a common transversal plane to form corresponding projected bore axes. More specifically, the central bore axes B of the first set of water dispensing bores 230*a* form a plurality of first projected central bore axes 236*a*, the central bore axes B of the second set of water dispensing bores 230*b* form a plurality of second projected central bore axes 236*b*, the central bore axes B of the third set of water dispensing bores 230*c* form a plurality of third projected central bore axes 236*c*, and the central bore axes B of the fourth set of water dispensing bores 230*d* form a plurality of fourth projected central bore axes 236*d*. Alternatively, instead of being parallel to each other, the central bore axes B of each set of water dispensing bores 230*a*, 230*b*, 230*c*, 230*d* could instead be angled relative to each other such that each set of water dispensing bores 230*a*, 230*b*, 230*c*, 230*d* defines projected central bore axes which converge towards each other or diverge from each other.

As explained above, the outlet openings 234 of each set of water dispensing bores 230*a*, 230*b*, 230*c*, 230*d* are disposed in a corresponding transversal plane T1, T2, T3, T4, and the transversal planes T1, T2, T3, T4 are spaced apart from each other longitudinally. The central bore axes B from each set of water dispensing bores 230*a*, 230*b*, 230*c*, 230*d* therefore does not intersect the central bore axes B from any of the other sets of water dispensing bores 230*a*, 230*b*, 230*c*, 230*d*. However, the water dispensing bores 230 of the first and second sets of water dispensing bores 230*a*, 230*b* are disposed such that, when their central bore axes B are orthogonally projected on one of the transversal planes T1, T2, T3 or T4, the projected central bore axes 236*a* of the first set of water dispensing bores 230*a* intersect the central bore axes 236*b* of the second set of water dispensing bores 236*b* at a non-zero angle.

In other words, according to a cylindrical coordinate system having a longitudinal axis defined by the longitudinal passageway axis L, the central bore axes B of the first and second sets of water dispensing bores 230*a*, 230*b* are angled relative to each other at a predetermined polar angle.

More specifically, FIG. 5 shows the first projected central bore axes 236*a* defined by the first set of water dispensing bores 230*a* and the second projected central bore axes 236*a* 236*b* defined by the second set of water dispensing bores 230*b*. In this embodiment, the pluralities of first and second projected central bore axes 236*a*, 236*b* are angled at a polar angle of about 90 degrees relative to each other and are therefore perpendicular to each other. As shown in FIG. 5, when viewed from the second end 204 of the concrete wetting section 200, the pluralities of first and second projected central bore axes 236*a*, 236*b* therefore substantially define a grid pattern. Alternatively, the pluralities of first and second projected central bore axes 236*a*, 236*b* could instead be angled relative to each other according to a polar angle which is different from 90 degrees.

Similarly, the third and fourth sets of water dispensing bores 230*c*, 230*d* are oriented such that the first and second projected central bore axes 236*a*, 236*b*, 230*d* are angled at predetermined non-zero angles relative to the third and fourth projected central bore axes 236*c*, 236*d* defined by the third and fourth sets of water dispensing bores 230*c*, 230*d*.

In the embodiment illustrated in FIG. 5, the third projected central bore axes 236*c* are generally parallel to the first projected central bore axes 236*a*. The third projected central bore axes 236*c* are further laterally offset relative to the first projected central bore axes 236*a* such that, when viewed from the second end 204 of the concrete wetting section 200, the first projected central bore axes 236*a* disposed alternately between the water sprays of the third projected central bore axes 236*c* in the grid pattern formed by the projected central bore axes. Alternatively, instead of being laterally offset relative to the first projected central bore axes 236*a*, the third set of water dispensing bores 230*c* could be disposed such that the third projected central bore axes 236*c* is aligned longitudinally with the first projected central bore axes 236*a*. In this configuration, the first projected central bore axes 236*a* and the third projected central bore axes 236*c* would appear to overlap each other when viewed from the second end 204 of the concrete wetting section 200.

In yet another embodiment, instead of the first and third projected central bore axes 236*a*, 236*c* being parallel to each other, the third set of water dispensing bores 230*c* could be disposed such that the first and third projected central bore axes 236*a*, 236*c* are angled relative to each other at a non-zero polar angle.

Still in the embodiment illustrated in FIG. 5, the fourth projected central bore axes 236*d* are generally parallel to the second projected central bore axes 236*b*. The fourth projected central bore axes 236*d* are therefore substantially perpendicular to the first and third projected central bore axes 236*a*, 236*c*.

The fourth projected central bore axes 236*d* are further laterally offset relative to the second projected central bore axes 236*b* such that, when viewed from the second end 204 of the concrete wetting section 200, the second projected central bore axes 236*b* are disposed alternately between the fourth projected central bore axes 236*d* in the grid pattern formed by the projected central bore axes. Alternatively, instead of being laterally offset relative to the second projected central bore axes 236*b*, the fourth set of water dispensing bores 230*d* could be disposed such that the fourth projected central bore axes 236*d* are aligned with the second projected central bore axes 236*b*. In this configuration, the second projected central bore axes 236*b* and the fourth projected central bore axes 236*d* would appear to overlap each other when viewed from the second end 204 of the concrete wetting section 200.

In yet another embodiment, instead of the second and fourth projected central bore axes 236*b*, 236*d* being parallel to each other, the fourth set of water dispensing bores 230*d* could be disposed such that the second and fourth projected central bore axes 236*b*, 236*d* are angled relative to each other at a non-zero polar angle.

It has been found that this configuration, as opposed, for instance, to a configuration in which the water dispensing bores 230 would be disposed in a single transversal plane and/or would all be distributed around the central passageway 110 and all oriented radially towards a center of the central passageway 110, provides a more uniform mixing of the dry concrete ingredients passing through the central passageway 110 with the water on all lateral sides, as well as throughout the cross-sectional area of the flow of concrete passing through the central passageway 110. This, in turn, may further improve the uniformity of the fresh concrete projected from the outlet body end 106 of the tubular body 102. This may further lead to a reduction of the concentration of suspended particles caused by the fresh concrete as it is dispensed from the assembly 100, which in turn could reduce loss of material, accelerate the application of shotcrete by allowing more shotcrete to be provided on the target surface over a certain period of time and generally make the shotcrete application less messy by preventing surfaces other than the target surface to be undesirably soiled by fresh concrete. Moreover, a reduction in the concentration of suspended particles during the application of shotcrete may further reduce health and safety risks for an operator of the shotcrete nozzle assembly 100, as well as improve the visibility during the application of shotcrete which may lead to a higher quality application of the shotcrete as well as to an increase in productivity. A reduction in the concentration of suspended particles during the application of shotcrete may further increase the social acceptability of the application of shotcrete in locations where passers-by may be exposed to the suspended particles, especially in enclosed environment such as subway stations, underground passages or the like.

For example, it has been observed that in some circumstances, the shotcrete nozzle assembly 100 comprising the concrete wetting section 200 described above and illustrated in FIGS. 1 to 6B could reduce the concentration of suspended particles by as much as 71% and the amount of fresh concrete particles rebounding on the target surface by as much as 31% when compared to a conventional shotcrete nozzle.

It will be understood that although in the above-described configuration, the central bore axes B of the water dispensing bores 230 of the first, second, third and fourth sets of water dispensing bores 230*a*, 230*b*, 230*c*, 230*d* are all oriented in a non-radial direction, only a portion of the central bore axes B of the water dispensing bores 230 of the first, second, third and/or fourth sets of water dispensing bores 230*a*, 230*b*, 230*c*, 230*d* could be oriented in a non-radial direction, with one or more of the water dispensing bores 230 of the first, second, third and/or fourth sets of water dispensing bores 230*a*, 230*b*, 230*c*, 230*d* being oriented in a radial direction. In other words, instead of the central bore axes B of the water dispensing bores 230 being all substantially spaced from and non-intersecting with the centrally-extending longitudinal passageway axis L, one or more of the water dispensing bores 230 could be oriented such that the central bore axes B thereof intersects the centrally-extending longitudinal passageway axis L. Notwithstanding, this configuration still provides at least some of the above-identified benefits over a conventional configuration in which the water dispensing bores 230 are all oriented radially towards a center of the central passageway 110.

The water debit and/or water pressure provided by the water source may further be adjusted using the water control valve 150 such that the water sprays are strong enough to shear the flow of dry concrete ingredients and thereby contribute to mixing the dry concrete ingredients with the water as it passes through the concrete wetting section 200. In one embodiment, the water is provided in the water inlet 208 at a pressure between about 3.5 MPa to 24 MPa. Alternatively, the water could be provided at a different pressure.

In an alternative embodiment, the water dispensing bores 230 may not be configured to atomize the water. Instead, the water may be dispensed in the central passageway 110 in the form of water jets made of a continuous stream of water, rather than water sprays made of discrete droplets. It will be understood that the above description would also apply to such an embodiment, with the water jets being substituted for water sprays.

Still in the illustrated embodiment, the concrete wetting section 200 further includes a plurality of annular grooves 250*a*, 250*b*, 250*c*, 250*d* which are defined in the inner face 218 of the inner tube 222. Specifically, the annular grooves 250*a*, 250*b*, 250*c*, 250*d* extend radially outwardly towards the outer face 220 of the inner tube 222 and circumferentially around the central passageway 110. Each annular groove 250*a*, 250*b*, 250*c*, 250*d* is disposed along a corresponding bore opening transversal plane T1, T2, T3, T4 of the concrete wetting section 200 such that the outlet openings 234 of the water dispensing bores 230 are located within the corresponding annular groove 250*a*, 250*b*, 250*c*, 250*d*. Therefore, the outlet openings 234 of the water dispensing bores 230 are slightly recessed with respect to a main portion of the central passageway 110.

More specifically, the concrete wetting section 200 includes a first annular groove 250*a* longitudinally aligned with the first transversal plane T1, a second annular groove 250*b* longitudinally aligned with the second transversal plane T2, a third annular groove 250*c* longitudinally aligned with the third transversal plane T3, and a fourth longitudinal groove 250*d* longitudinally aligned with the fourth transversal plane T4. In this configuration, the outlet openings 234 of the first set of water dispensing bores 230*a* are therefore located within the first annular groove 250*a*, the outlet openings 234 of the second set of water dispensing bores 230*b* are located within the second annular groove 250*b*, the outlet openings 234 of the third set of water dispensing bores 230*c* are located within the third annular groove 250*c* and the outlet openings 234 of the fourth set of water dispensing bores 230*d* are located within the fourth annular groove 250*d*. It will be appreciated that the grooves 250*a*, 250*b*, 250*c*, 250*d* may further contribute to mixing the concrete ingredients passing through the concrete wetting section 200 with water more uniformly by spacing the outlet openings 234 radially outwardly away from the dry concrete ingredients passing in the central passageway 110.

In the illustrated embodiment, since the water dispensing bores 230 are angled longitudinally towards the outlet body end 106, the annular grooves outlet openings 250*a*, 250*b*, 250*c*, 250*d* may interfere with the water sprays or jets formed by the water dispensing bores 230 if the outlet openings 234 of the water dispensing bores 230 were located too deep within the annular groove 250*a*, 250*b*, 250*c*, 250*d* and/or if the annular groove 250*a*, 250*b*, 250*c*, 250*d* is too narrow. Therefore, the annular grooves 250*a*, 250*b*, 250*c*, 250*d* could be sized and shaped such that the annular grooves 250*a*, 250*b*, 250*c*, 250*d* do not interfere with the water sprays or jets formed by the water dispensing bores 230.

In the illustrated embodiment, each annular groove 250*a*, 250*b*, 250*c*, 250*d* has a width of between 1 to 10 times the diameter of the water dispensing grooves 230 and a depth of between 0 mm and 5 mm. Alternatively, the annular grooves 250*a*, 250*b*, 250*c*, 250*d* could have any of other size and/or dimension which a skilled person would consider to be appropriate.

Still in the illustrated embodiment, all the annular grooves 250*a*, 250*b*, 250*c*, 250*d* are similarly sized and shaped to each other. Alternatively, the annular grooves 250*a*, 250*b*, 250*c*, 250*d* could have different shapes, width and depth from each other. In yet another embodiment, the concrete wetting section 200 may not even include any annular grooves 250*a*, 250*b*, 250*c*, 250*d*, the inner face 218 of the inner tube 222 instead being substantially smooth and continuous between the first and second ends 202, 204 of the concrete wetting section 200.

It will be understood that the above configuration of the sets of sets of water dispensing bores 230*a*, 230*b*, 230*c*, 230*d* and of the corresponding annular grooves 250*a*, 250*b*, 250*c*, 250*d* are merely provided as an example, and that many alternative configurations would be possible. For example, the concrete wetting section 200 could instead include a number of sets of water dispensing bores 230*a*, 230*b*, 230*c*, 230*d* and of grooves annular grooves 250*a*, 250*b*, 250*c*, 250*d* comprised between 2 and 10. Alternatively, the concrete wetting section 200 could include more than 10 sets of water dispensing bores 230*a*, 230*b*, 230*c*, 230*d* and of grooves annular grooves 250*a*, 250*b*, 250*c*, 250*d*.

Moreover, the total number of water dispensing bores 230 distributed among these sets of water dispensing bores could be between 5 and 85, but could alternatively include less than 5 or more than 85 water dispensing bores 230.

Figure 7:
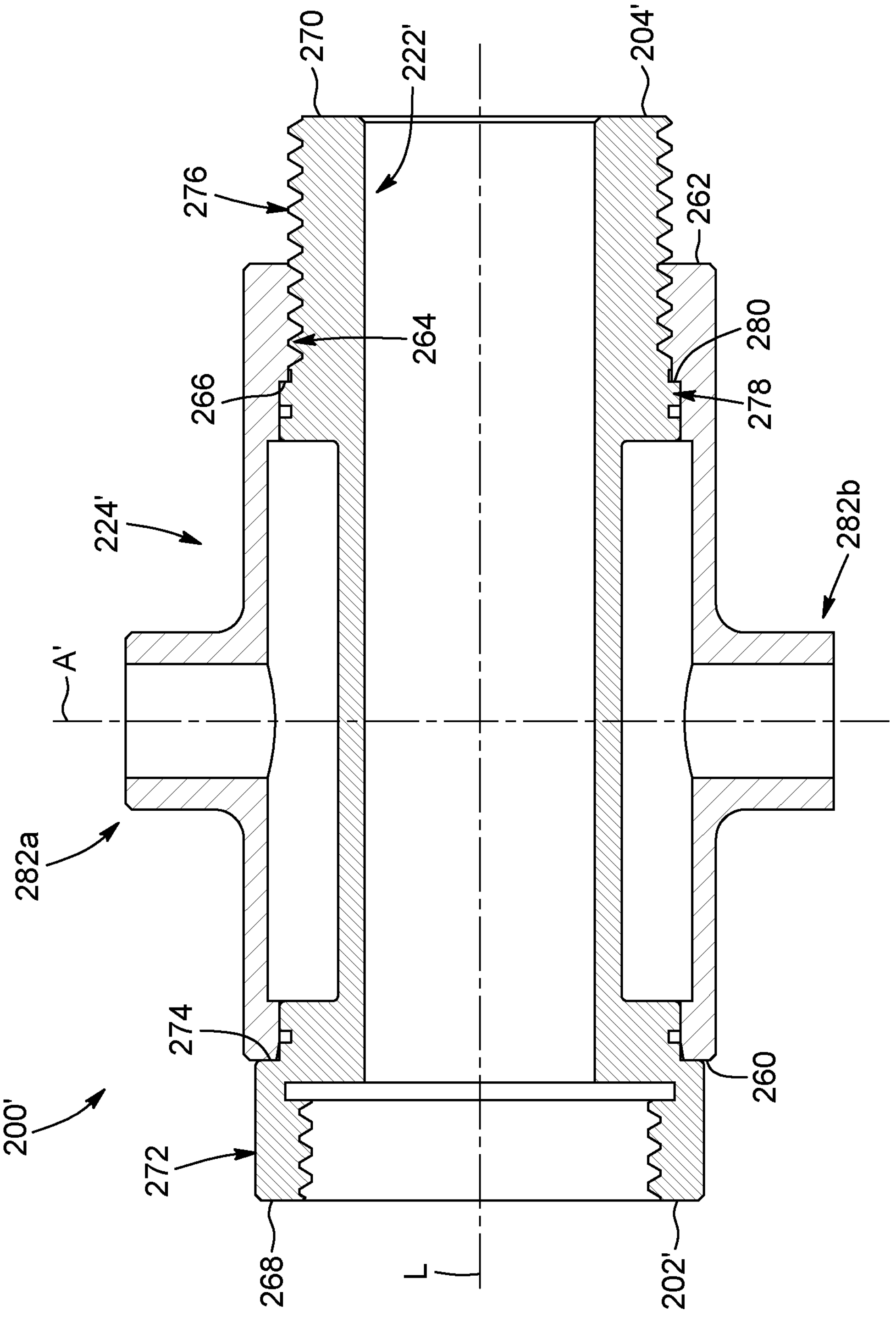
FIG. 7 is a longitudinal cross-section view of a concrete wetting section for a shotcrete nozzle assembly, in accordance with another embodiment.
Figure 8:
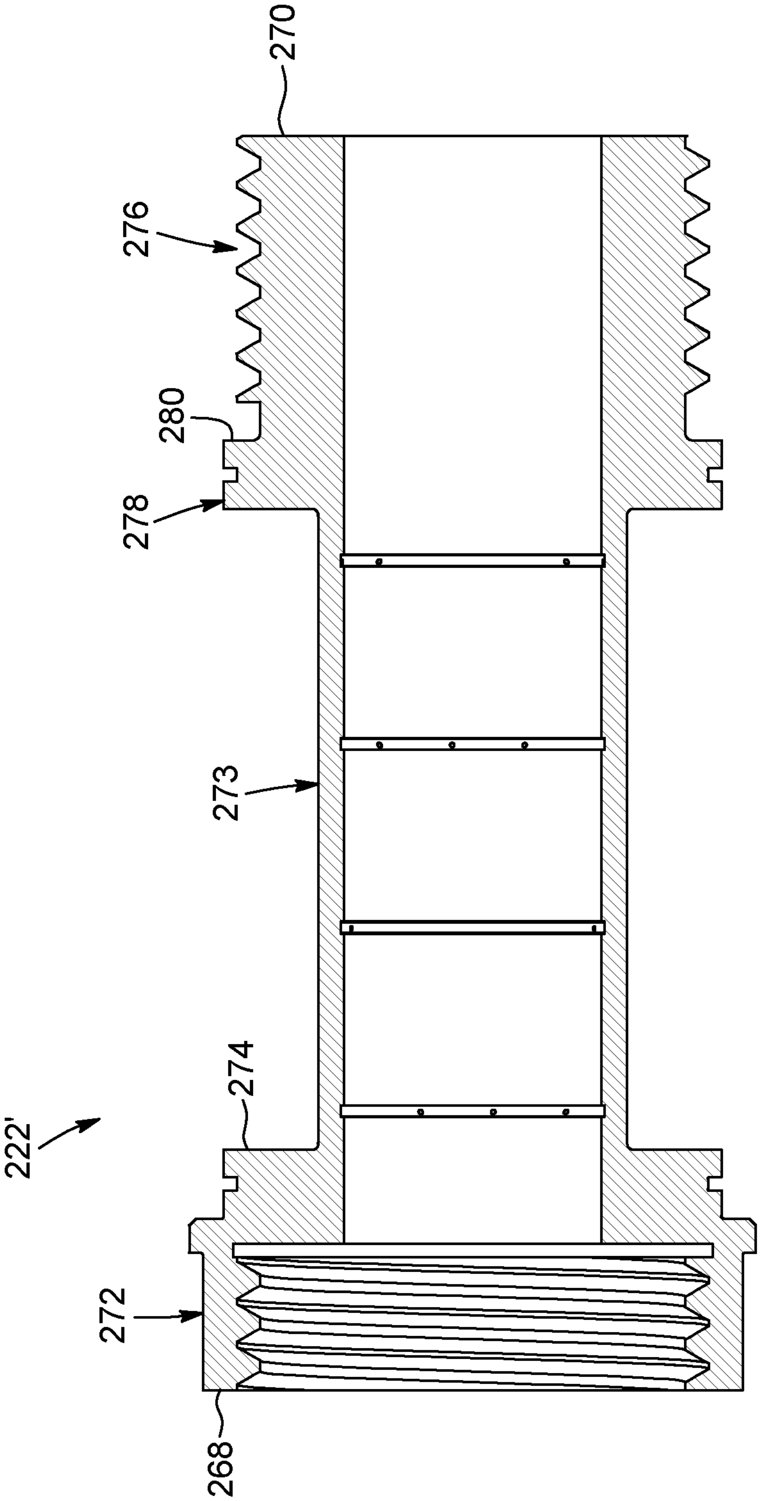
FIG. 8 is a longitudinal cross-section view of an inner tube for the concrete wetting section illustrated in FIG. 7.
Figure 9:
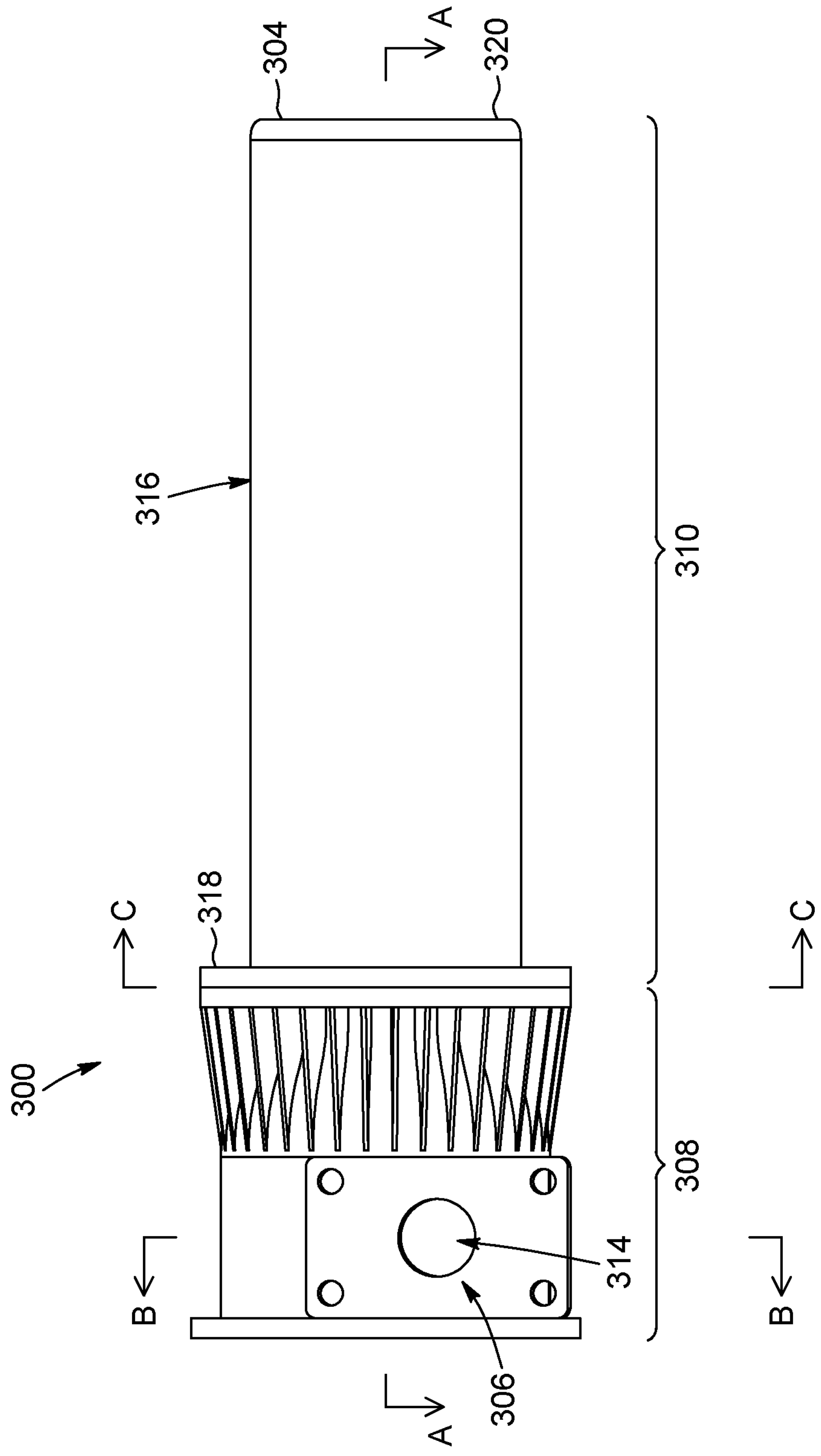
FIG. 9 is a side elevation view of a stream controlling section of the shotcrete nozzle assembly illustrated in FIG. 1.
Figure 10:
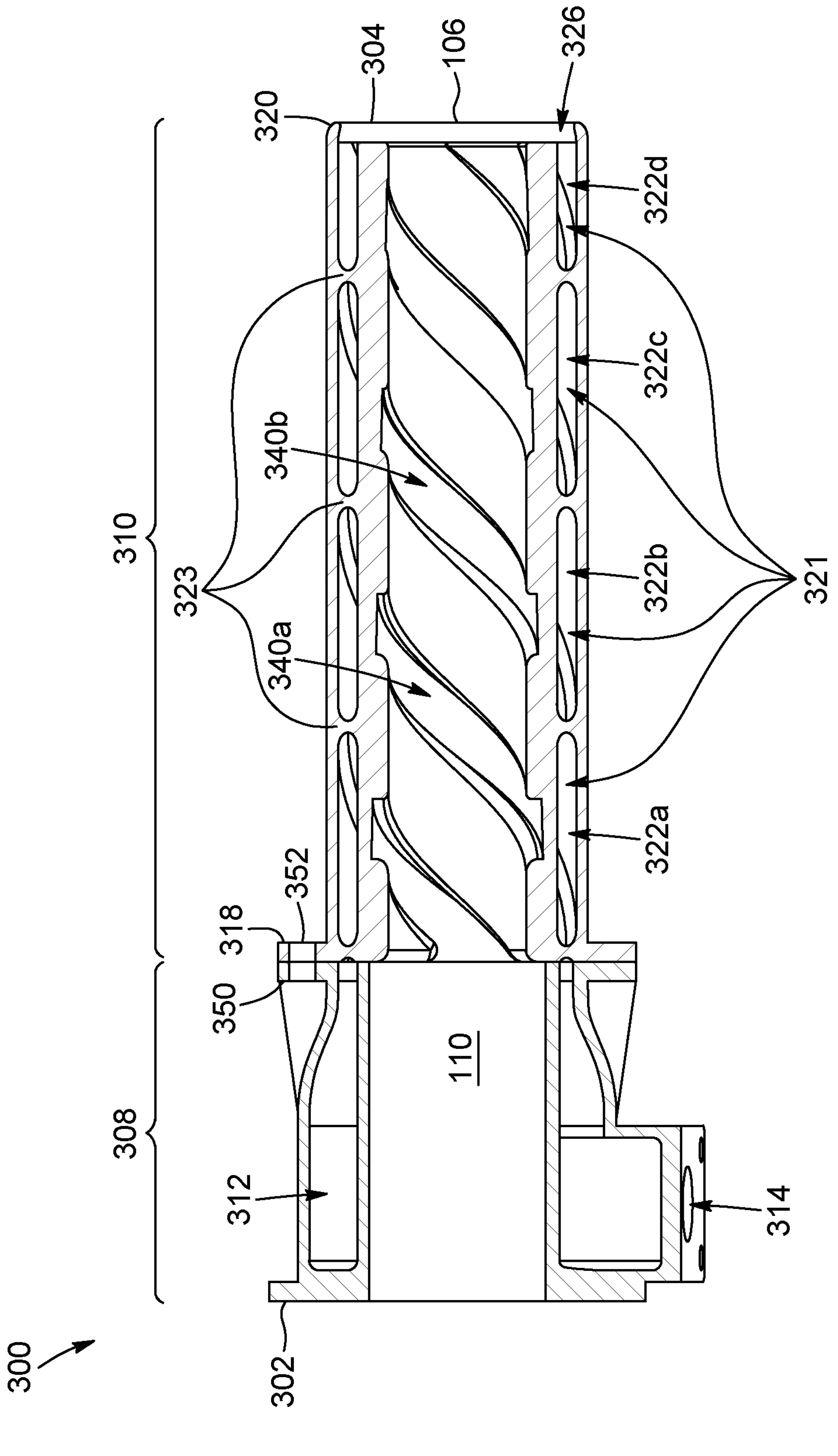
FIG. 10 is a longitudinal cross-section view, taken along section line A-A, of the stream controlling section illustrated in FIG. 9.

Referring now to FIGS. 7 and 8, there is shown a concrete wetting section 200' for the shotcrete nozzle assembly 100, in accordance with another embodiment. Similarly to the concrete wall section 200, the concrete wall section 200' is double-walled and includes an inner tube 222' and an outer tube 224'. In this embodiment, the outer tube 224' has a first end 260 located towards a first end 202' of the concrete wetting section 200' and a second end 262 located towards a second end 204' of the concrete wetting section 200' with an internally-threaded portion 264 located adjacent to its second end 262. More specifically, the internally-threaded portion 264 extends slightly inwardly into the central passageway 110 to define an inner annular shoulder 266 facing generally towards the first end 260 of the outer tube 224'.

Still in this embodiment, the inner tube 222' extends between a first end 268 located towards the first end 202' of the concrete wetting section 200' and a second end 270 located towards the second end 204' of the concrete wetting section 200'. The inner tube 222' further includes a first enlarged diameter portion 272 located adjacent to its first end 268. More specifically, the enlarged diameter portion 272 extends radially outwardly from a central segment 273 of the inner tube 222' to define an outer annular stop 274 which faces generally towards the second end 270 of the inner tube 222'.

The inner tube 222' further includes an externally-threaded portion 276 located adjacent to its second end 270 and a second enlarged diameter portion 278 extending longitudinally from the externally-threaded portion 276 towards the first end 268. Specifically, the second enlarged diameter portion 278 extends radially outwardly from the central segment 273 to define an inner annular stop 280 which faces generally towards the second end 270 of the inner tube 222'.

In this embodiment, the inner tube 222' is insertable axially into the outer tube 224' through the first end 260 of the outer tube 224' and towards the second end 262. When the externally-threaded portion 276 of the inner tube 222' reaches the internally-threaded portion 264 of the outer tube 224', the externally-threaded portion 276 may further be threadably engaged with the internally-threaded portion 264 and screwed into the internally-threaded portion 264 to further move the inner tube 222' axially into the outer tube 224' until the outer annular stop 274 abuts the first end 260 of the outer tube 224' and/or the inner annular stop 280 abuts the inner annular shoulder 266 to the outer tube 224'. In this position, the inner tube 222' is therefore connected to the outer tube 224' and forms, with the outer tube 224', the concrete wetting section 200'.

In the embodiment illustrated in FIGS. 7 and 8, when the inner tube 222' is fully inserted in the outer tube 224', the externally-threaded portion 276 further extends beyond the second end 262 of the outer tube 224' to threadably engage a corresponding threaded portion of the stream controlling section 300 and thereby connect the stream controlling section 300 to the concrete wetting section 200', as will be described in more details below.

Still in this embodiment, as shown in FIG. 7, instead of including a single tubular inlet member, the water inlet includes a pair of tubular inlet members 282*a*, 282*b* disposed radially opposite each other and extending radially outwardly from the outer tube 224'. In this embodiment, the tubular inlet members 282*a*, 282*b* are coaxial and extend along a common inlet axis A' which is generally orthogonal to the longitudinal passageway axis L. Alternatively, the tubular inlet members 282*a*, 282*b* could be offset relative to each other or to the longitudinal passageway axis L, or could be disposed such that the inlet axis A' is angled relative to the longitudinal passageway axis L.

Referring now to FIGS. 2 and 9 to 12, the stream controlling section 300 includes a first end 302 adapted to be connected to the second end 204 of the concrete wetting section 200 and a second end 304 which corresponds to the outlet body end 106 of the tubular body 102.

In the illustrated embodiment, the stream controlling section 300 includes an air inlet 306 operatively connectable to the pressurized air source. Specifically, the stream controlling section 300 includes an air inlet manifold 308 located adjacent to the first end 302 and an elongated nozzle tip portion 310 extending between the inlet manifold 308 and the second end 304 of the stream controlling section 300.

Figure 11:
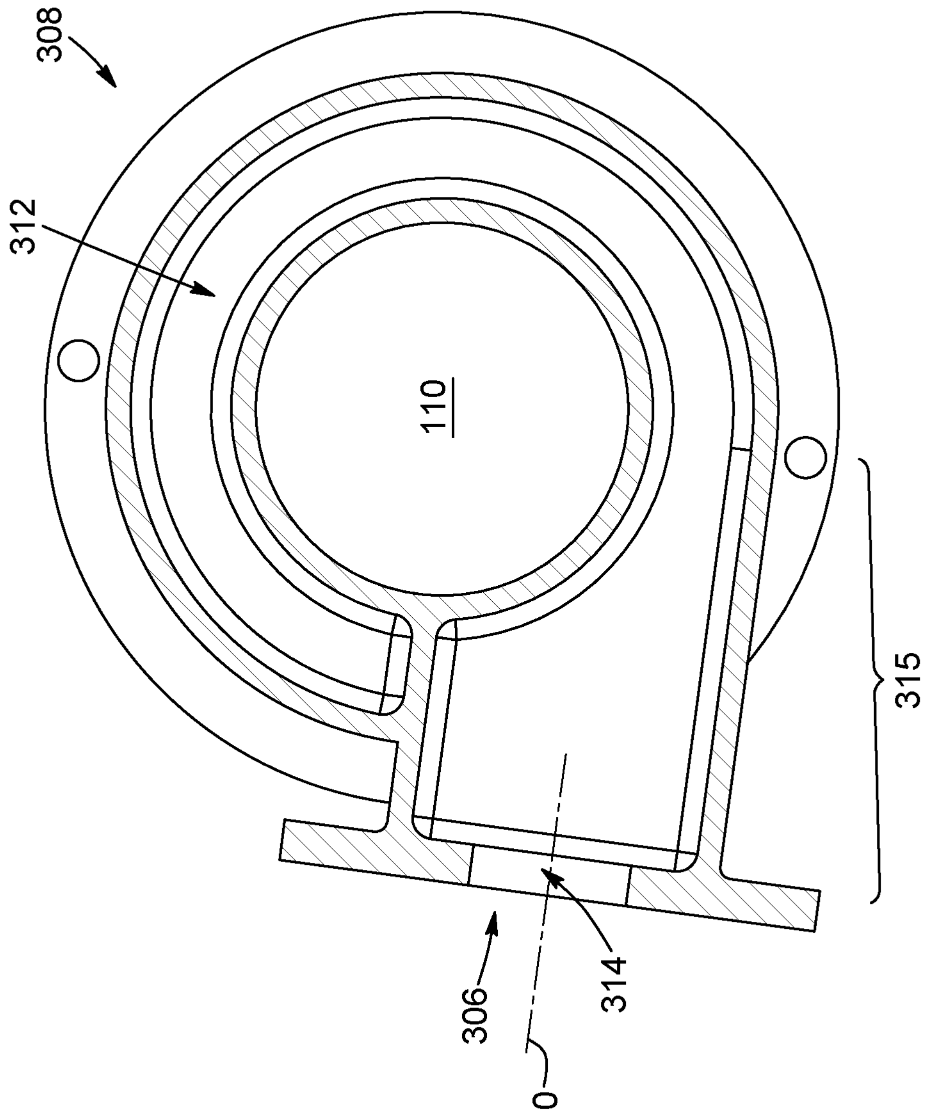
FIG. 11 is a transversal cross-section view, taken along section line B-B, of the stream controlling section illustrated in FIG. 9, showing the interior of the air inlet manifold.
Figure 12:
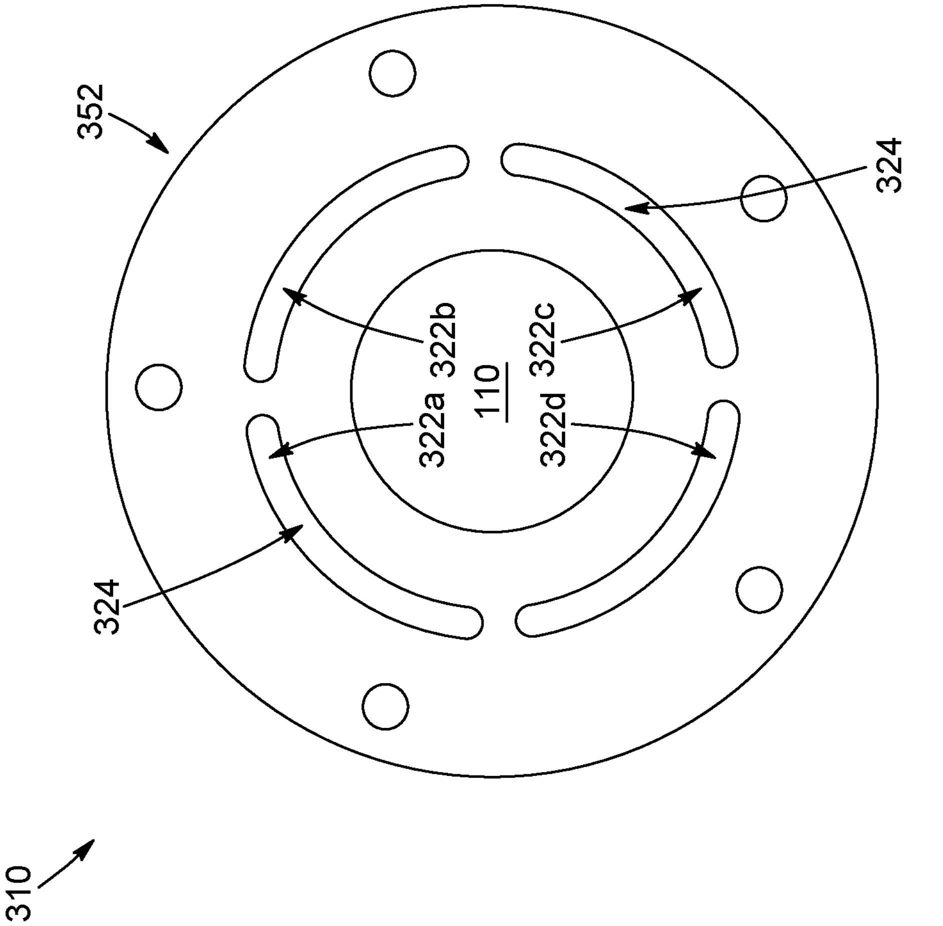
FIG. 12 is a transversal cross-section view, taken along section line C-C, of the stream controlling section illustrated in FIG. 9, showing the air inlet ends of the four helicoidal air conduits disposed around the central passageway.

As shown in FIG. 11, the air inlet manifold 308 includes an annular manifold inner conduit 312 which defines an annular path surrounding the central passageway 110. The air inlet 306 is defined in the air inlet manifold 308 and includes a circular air inlet opening 314 which allows the air from the pressurized air source to enter the manifold inner conduit 312. The air inlet opening 314 defines a manifold opening axis O, along which the air is directed as it enters the manifold inner conduit 312. As shown in FIG. 11, the air inlet opening 314 is positioned such that the manifold opening axis O is offset relative to the center of the central passageway 110 and extends generally tangentially relative to the central passageway 110 so as to guide the air from the pressurized air source into the air manifold 308 in a tangential direction relative to the central passageway 110. In other words, the manifold inner conduit 312 includes an inlet segment 315 which extends from the air inlet opening 314 inwardly into the air inlet manifold 308 and which extends in a substantially tangential direction with respect to the central passageway 110 to guide the air in a corresponding tangential direction.

In the illustrated embodiment, the body sidewall 108 includes a nozzle tip sidewall section 316 which extends along the nozzle tip portion 310 between a first nozzle tip end 318 adjacent to and extending from the air manifold 308 and a second nozzle tip end 320 opposite the first nozzle tip end 318.

Still in the illustrated embodiment, the nozzle tip sidewall section 316 is hollow and includes a peripheral air conduit 321 which extends between the first and second nozzle tip ends 318, 320. More specifically, the nozzle tip sidewall section 316 includes a plurality of partition walls 323 which divide the peripheral air conduit 321 into first, second, third and fourth helicoidal air conduits 322*a*, 322*b*, 322*c*, 322*d*. Each helicoidal air conduit 322*a*, 322*b*, 322*c*, 322*d* includes a conduit inlet 324 in communication with the manifold inner conduit 312 of the air inlet manifold 308 and a conduit outlet 326 located at the outlet body end 106 and which is transversely offset relative to the central passageway 110, i.e. offset with respect to a periphery of the central passageway 110. The helicoidal air conduits 322*a*, 322*b*, 322*c*, 322*d* are configured for guiding the air from the air inlet manifold 308 in an helicoidal path around the central passageway 110, through the nozzle tip portion 310 and out through the conduit outlet 326, generally in the same longitudinal direction as the stream of fresh concrete projected from the outlet body end 106.

In the illustrated embodiment, the helicoidal air conduits 322*a*, 322*b*, 322*c*, 322*d* are isolated from the central passageway 110, so as not to mix the air with the fresh concrete as it passes through the stream controlling section 300. Alternatively, the helicoidal air conduits 322*a*, 322*b*, 322*c*, 322*d* could communicate with the central passageway 110 through one or more air openings extending between one or more of the helicoidal air conduits 322*a*, 322*b*, 322*c*, 322*d* and the central passageway 110 to allow a portion of the pressurized air travelling through the corresponding helicoidal air conduit 322*a*, 322*b*, 322*c*, 322*d* to enter the central passageway 110 and further urge the fresh concrete through the central passageway 110.

The helicoidal path of the air through the nozzle tip portion 310 causes the air to continue travelling in a generally helicoidal airflow as it exits the helicoidal air conduits 322*a*, 322*b*, 322*c*, 322*d* beyond the outlet body end 106. The airflow will therefore twist around the stream of fresh concrete projected from the outlet body end 106 and accelerate fresh concrete particles located in an outer layer of the stream of fresh concrete. These particles may have been decelerated relative to the rest of the stream of fresh concrete as the concrete passes through the nozzle assembly 100, causing them to not have enough speed or energy to adhere to the surface and to thereby rebound against the surface. By providing this helicoidal airflow to accelerate these particles, the amount of fresh concrete particles which adhere to the surface are increased, thereby reducing the amount of rebound and therefore of waste from a shotcrete operation.

Furthermore, the generally helicoidal airflow could prevent the stream of fresh concrete from spreading into a conical stream as it travels between the outlet body end 106 and the surface on which the fresh concrete is to be applied. Specifically, the stream of fresh concrete may be substantially confined within an interior, cylindrical axially-extending space of the helicoidal airflow to thereby adopt a similar, generally cylindrical shape. This allows the stream of fresh concrete to be more directed or focused on the surface on which the fresh concrete is to be applied and thereby contributes to preventing the fresh concrete from splattering onto adjacent surfaces.

In one embodiment, the air is provided by the pressurized air source at a pressure of about 0.5 MPa to 3.5 MPa. Alternatively, the air could be provided by the pressurized air source at a different pressure.

In the illustrated embodiment, the four helicoidal air conduits 322*a*, 322*b*, 322*c*, 322*d* are similarly sized and shaped to each other, but are angularly offset relative to each other around the central passageway 110. Specifically, the conduit inlets 324 of the helicoidal air conduits 322*a*, 322*b*, 322*c*, 322*d* are angularly offset by 90 degrees relative to each other. It will be understood that the conduit outlets 326 are similarly angularly offset relative to each other. The helicoidal air conduits 322*a*, 322*b*, 322*c*, 322*d* therefore extend equidistant from each other as they twist around the central passageway 110 from the first nozzle tip end 318 to the second nozzle tip end 320.

In another embodiment, the nozzle tip portion 310 may not include four helicoidal air conduits 322*a*, 322*b*, 322*c*, 322*d*. Instead, the nozzle tip portion 310 may include any number of helicoidal air conduits 322*a*, 322*b*, 322*c*, 322*d* between two to eight helicoidal conduits. In yet another embodiment, the nozzle tip portion 310 could include a single helicoidal conduit, or more than eight helicoidal conduits.

In the illustrated embodiment, the nozzle tip portion 310 is further adapted to mix the fresh concrete coming from the concrete wetting section 200 and passing through the stream controlling section 300 before it is expelled through the outlet body end 106. Specifically, the nozzle tip sidewall section 316 includes an inner face 330 which faces inwardly towards the central passageway 110. In the illustrated embodiment, the nozzle tip sidewall section 316 further includes two helicoidal recesses 340*a*, 340*b* extending radially outwardly into the inner face 330. It will be appreciated that the fresh concrete, or at least an outer layer of the fresh concrete, is substantially twisted by the two helicoidal recesses 340*a*, 340*b* as it moves along the nozzle tip portion 310. This may contribute to the homogeneity and uniformity of the stream of fresh concrete which is projected from the outlet body end 106. In some implementations, concrete characterized by a higher homogeneity showed higher compressive strength. Alternatively, the nozzle tip portion 310 could include any number of helicoidal recesses between two and six helicoidal recesses 340*a*, 340*b*. In another embodiment, the nozzle tip portion 310 could include a single helicoidal recess 340*a*, 340*b* or more than six helicoidal recesses 340*a*, 340*b*. In another embodiment, the recesses may not be helicoidal and may instead be configured according to any other configuration that a skilled person would consider to be suitable to mix the fresh concrete as it passes through the nozzle tip portion 310. In still another embodiment, the nozzle tip sidewall section 316 could instead be free of recess and therefore be substantially smooth.

In the illustrated embodiment, the air inlet manifold 308 and the nozzle tip portion 310 are provided as distinct components which are secured together to form the stream controlling section 300. More specifically, the inlet manifold 308 includes a first peripheral and outwardly-extending flange 350 and the nozzle tip portion 310 includes a second peripheral and outwardly-extending flange 352 sized and shaped to be placed against the first flange 350 and to be secured to the first flange 350 using suitable mechanical fasteners. Alternatively, the inlet manifold 308 and the nozzle tip portion 310 could be secured together using other securing techniques such as welding or the like. In yet another embodiment, the air inlet manifold 308 and the nozzle tip portion 310 could instead be integrally formed together such that the stream controlling section 300 includes a single, unitary body.

It will further be appreciated that although the concrete wetting section 200 and the stream controlling section 300 have been described hereinabove in combination with each other, they could instead be used independently from each other. In another embodiment, the concrete wetting section 200 could be used with a conventional nozzle tip section. Similarly, in another embodiment, the above stream controlling section 300 could be used with a conventional water ring. In yet another embodiment, the stream controlling section 300 could instead be provided as an independent stream controlling device for use with a shotcrete nozzle assembly adapted to be used for wet-mix shotcrete. In this embodiment, the first end 302 of the stream controlling section 300 could be operatively connected directly to a fresh concrete source which provides fresh concrete to the stream controlling section via the shotcrete nozzle assembly, instead of being connected to a water ring.

The above-described shotcrete nozzle assembly 100, including the concrete wetting section 200 and the stream controlling section 300, is particularly suitable to be used with fast setting concrete and fiber-reinforced concrete.

Figure 13:
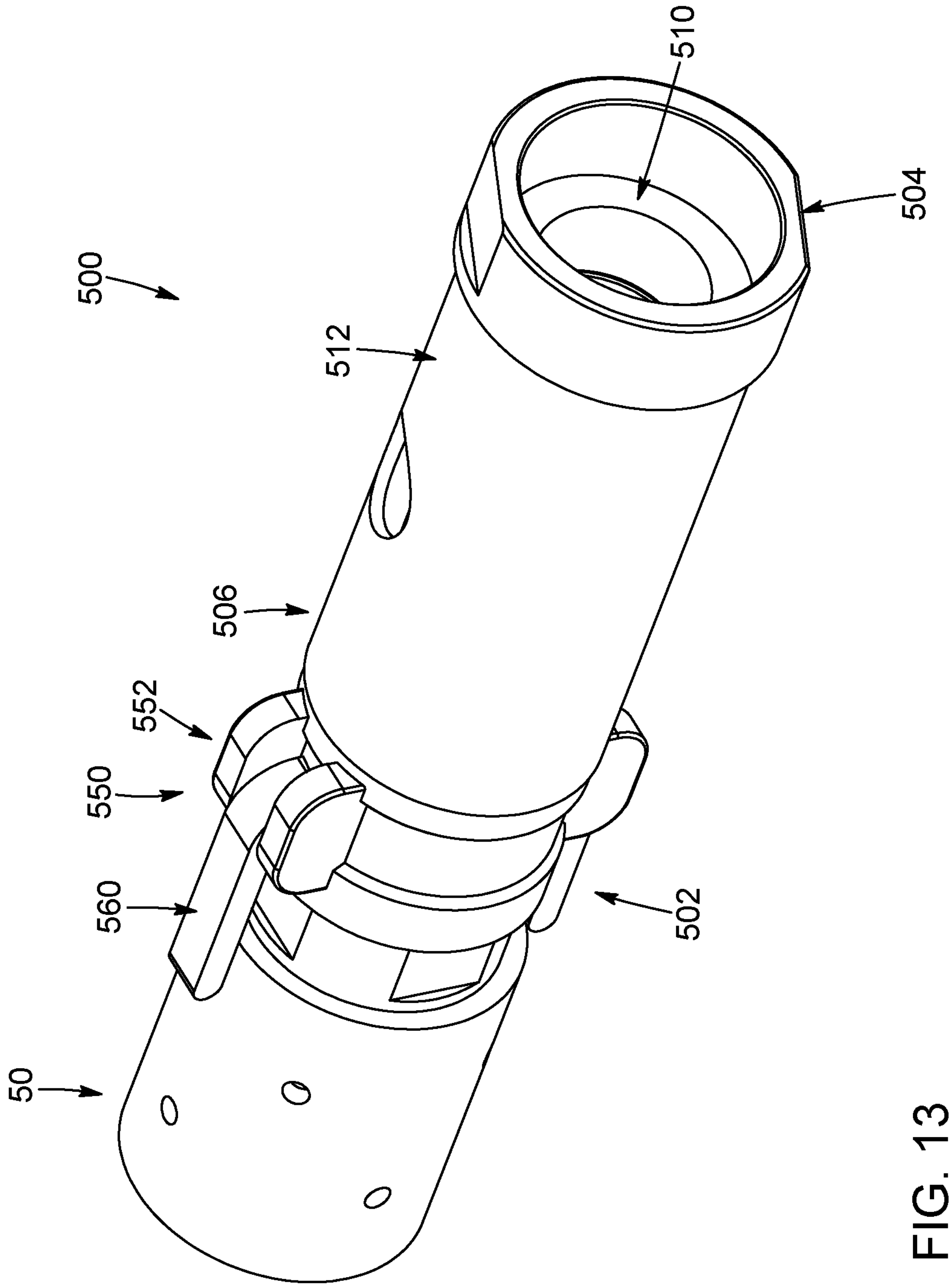
FIG. 13 is a perspective view of a concrete wetting section for a shotcrete nozzle assembly, in accordance with another embodiment.
Figure 14:
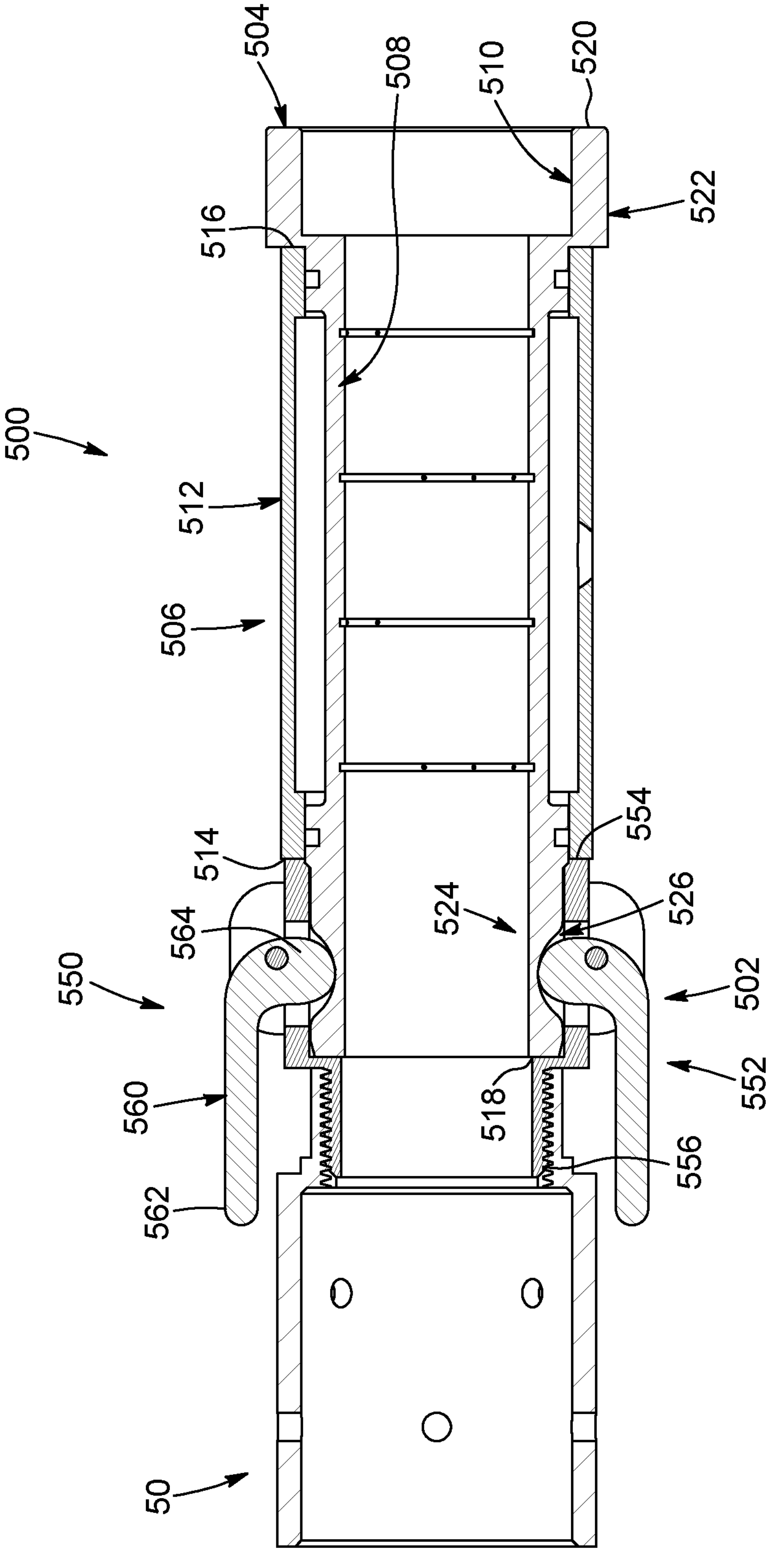
FIG. 14 is a longitudinal cross-section view of the concrete wetting section illustrated in FIG. 13.

Turning now to FIGS. 13 and 14, there is shown a concrete wetting section 500 for the shotcrete nozzle assembly 100, in accordance with another embodiment. The concrete wetting section 500 is generally similar to the concrete wetting sections 200 and 200' illustrated in FIGS. 1 to 8 and extends between a first end 502 and a second end 504.

The concrete wetting section 500 includes an outer wall 506 and an inner wall 508 spaced radially inwardly from the outer wall 506. Similarly to the concrete wetting sections 200 and 200', the concrete wetting section 500 is made of two distinct portions: an inner tube 510 which defines the inner wall 508 and an outer tube 512 which defines the outer wall 506.

The outer tube 512 extends between a first outer tube end 514 located towards the first end 502 of the concrete wetting section 500 and a second outer tube end 516 located towards the second end 504 of the concrete wetting section 500.

The inner tube 510 extends between a first inner tube end 518 located towards the first end 502 of the concrete wetting section 500 and a second inner tube end 520 located towards the second end 504 of the concrete wetting section 500.

In the embodiment illustrated in FIGS. 13 and 14, the inner tube 510 further includes an enlarged diameter portion 522 located at the second inner tube end 520. The enlarged diameter portion 522 has a diameter which is larger than a diameter of the outer tube 512 such that the second outer tube end 516 may abut the enlarged diameter portion 522 when the outer tube is inserted over the inner tube and is moved towards the second end 504 of the concrete wetting section 500.

In the illustrated embodiment, the shotcrete nozzle assembly 100 further includes a hose connector 550 securable to a dry concrete ingredients dispensing hose, not shown, operatively coupled to the concrete source. The hose connector 550 is configured to engage a nozzle inlet connecting portion 524 of the concrete wetting section 500 located at or near the first end 502 of the concrete wetting section 500.

In the illustrated embodiment, the nozzle inlet connecting portion 524 is defined in the inner tube 510 and includes a circumferential outer groove 526.

Still in the illustrated embodiment, the hose connector 550 includes a female cam coupling or camlock fitting collar 552 sized and shaped to be coaxially inserted over the nozzle connecting portion 560.

In the illustrated embodiment, the female cam fitting collar 552 includes a collar body 553 having a proximal collar end 554 located towards the concrete wetting section 500 when the female cam fitting collar 552 is connected to the concrete wetting section 500 and a distal collar end 556 located away from the proximal collar end 554. The female cam fitting collar 552 includes an externally-threaded portion 558 located at the distal collar end 556 for threadably engaging a hose end fitting 50 which is itself secured to a delivery end of the dry concrete ingredients delivery hose via fasteners or any other suitable securing technique. The female cam fitting collar 552 further includes a pair of cam members 560 pivotably connected to the collar body 553 and located on opposite sides of the collar body 553. Each cam member 560 is pivotable about a cam pivot axis which is perpendicular to the longitudinal passageway axis of the concrete wetting section 500, and includes a handle end 562 for allowing a user to pivot the cam member 560 and a cam end 564 located away from the handle end 562. Specifically, the cam end 564 is sized and shaped to engage the circumferential outer groove 526 of the nozzle inlet connecting portion 524. By using the handle end 562, a user can selectively move the cam member 560 between a locked position in which the cam end 564 engages the circumferential outer groove 526 so as to prevent axial movement of the female cam fitting collar 552 relative to the concrete wetting section 500, and an unlocked position in which the cam end 564 is clear from the circumferential outer groove 526 to allow the female cam fitting collar 552 to be removed from the concrete wetting section 500.

In the illustrated embodiment, the circumferential outer groove 526 is further positioned longitudinally along the inner tube 510 such that when the female cam fitting collar 552 engages the nozzle inlet connecting portion 524 and is in the locked position, the proximal collar end 554 abuts the first outer tube end 514. In this configuration, the outer tube 512 is therefore held longitudinally between the female cam fitting collar 552 and the enlarged diameter portion 522 of the inner tube 510. The outer tube 512 may therefore not require any additional connection to the inner tube 510. Alternatively, the outer tube 512 could further be connected to the inner tube 510 via fasteners or another suitable type of connection.

It will be understood that although the female cam fitting collar 552 is illustrated as comprising two cam member 560, the female cam fitting collar 552 could instead include a single cam member or more than two cam members. Still in the illustrated embodiment, to facilitate movement of the cam members between the locked and the unlocked positions, the circumferential outer groove 526 has a cross-section which substantially corresponds to a sector of a circle. Alternatively, the circumferential outer groove 526 may have one or various other shapes.

In another embodiment, the hose connector 550 may not form part of the assembly 100 and the nozzle connecting portion 524 may be connectable to an existing suitable connector, which could include an off-the-shelf connector or a customized connector, which could be secured to a corresponding hose.

It will be understood that the above configuration is merely provided as an example and that many alternative configurations are possible. For example, the concrete wetting section 500 may not be directly connected to a stream controlling section such as the stream controlling section 300, but could instead be connected to the stream controlling section via an extension hose such that the stream controlling section is remote from the concrete wetting section 500. In this embodiment, the concrete wetting section 500 could further include a nozzle outlet connecting portion similar to the nozzle inlet connecting portion 524 but located at the second end 504 of the concrete wetting section 500. The nozzle outlet connecting portion could be sized and shaped to engage a female cam fitting collar similar to the female cam fitting collar 552 which could threadably engage a hose end fitting similar to the hose end fitting 50 secured to the extension hose.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

We claim:

1. A shotcrete nozzle assembly comprising:

a tubular body having an open inlet body end, an open outlet body end and a body sidewall defining a central passageway extending between the inlet and outlet body ends along a longitudinal passageway axis centrally positioned in the central passageway, the body sidewall having an inner face facing inwardly towards the central passageway, the inlet body end being operatively connectable to a concrete source for providing dry concrete ingredients into the central passageway, the tubular body including:

a water inlet defined in the body sidewall, the water inlet being operatively connectable to a water source, the water inlet being in fluid communication with the central passageway to allow water to be dispensed from the water source into the central passageway to mix the dry concrete ingredients passing in the central passageway with water to form fresh concrete; and a plurality of water dispensing bores extending through the body sidewall between the water inlet and the central passageway to allow the water to be dispensed into the central passageway, each water dispensing bore defining an outlet opening in the inner face of the body sidewall, the outlet openings of the water dispensing bores being oblong and elongated in a longitudinal direction parallel to the longitudinal passageway axis, and each water dispensing bore extending along a central bore axis, the plurality of water dispensing bores including:

a first set of water dispensing bores positioned such that the outlet openings thereof are spaced apart from each other and are disposed in a first bore opening transversal plane extending perpendicularly to the longitudinal passageway axis, the first set of water dispensing bores being oriented such that the central bore axes of at least a portion of the first set of water dispensing bores extend in a non-radial direction relative to the longitudinal passageway axis; and a second set of water dispensing bores positioned such that the outlet openings thereof are spaced apart from each other and are disposed in a second bore opening transversal plane spaced longitudinally from the first bore opening transversal plane and towards the outlet body end, the second set of water dispensing bores being oriented such that the central bore axes of at least a portion of the second set of water dispensing bores extend in a non-radial direction relative to the longitudinal passageway axis, and such that an orthogonal projection of the central bore axes of the first set of water dispensing bores onto one of the first and second bore opening transversal planes forms a plurality of first projected central bore axes and an orthogonal projection of the central bore axes of the second set of water dispensing bores onto the one of the first and second bore opening transversal planes forms a second plurality of projected central bore axes which intersect the first projected central bore axes at a first non-zero angle.

2. The assembly as claimed in claim 1, wherein each set of water dispensing bores includes a first subset of water dispensing bores and a second subset of water dispensing bores, the first and second subsets of water dispensing bores being located opposite each other across the central passageway.

3. The assembly as claimed in claim 2, wherein the first subset of water dispensing bores are oriented such that the central bore axes thereof extend parallel to each other.

4. The assembly as claimed in claim 3, wherein the second subset of water dispensing bores are oriented such that the central bore axes thereof extend parallel to each other.

5. The assembly as claimed in claim 4, wherein each water dispensing bore of the first subset of water dispensing bores is aligned with a corresponding water dispensing bore of the second subset of water dispensing bores.

6. The assembly as claimed in claim 4, wherein the first projected central bore axes extend perpendicular to the second projected central bore axes.

7. The assembly as claimed in claim 1, wherein the plurality of water dispensing bores further comprises a third set of water dispensing bores positioned such that the outlet openings thereof are spaced apart from each other and are disposed in a third bore opening transversal plane spaced longitudinally from the second bore opening transversal plane and towards the outlet body end, the third set of water dispensing bores being oriented such that the central bore axes thereof all extend in a non-radial direction relative to the longitudinal passageway axis.

8. The assembly as claimed in claim 7, wherein the plurality of water dispensing bores further comprises a fourth set of water dispensing bores positioned such that the outlet openings thereof are spaced apart from each other and are disposed in a fourth bore opening transversal plane spaced longitudinally from the third bore opening transversal plane and towards the outlet body end, the fourth set of water dispensing bores being oriented such that the central bore axes thereof all extend in a non-radial direction relative to the longitudinal passageway axis and such that an orthogonal projection of the central bore axes of the third set of water dispensing bores onto the one of the first and second bore opening transversal planes forms a plurality of third projected central bore axes and an orthogonal projection of the central bore axes of the fourth set of water dispensing bores onto the one of the first and second bore opening transversal planes forms a plurality of fourth projected central bore axes which intersect the third projected central bore axes at a second non-zero angle.

9. The assembly as claimed in claim 8, wherein each set of water dispensing bores includes a first subset of water dispensing bores and a second subset of water dispensing bores, the first and second subsets of water dispensing bores being located opposite each other across the central passageway.

10. The assembly as claimed in claim 9, wherein the third subset of water dispensing bores are oriented such that the central bore axes thereof extend parallel to each other.

11. The assembly as claimed in claim 10, wherein the fourth subset of water dispensing bores are oriented such that the central bore axes thereof extend parallel to each other.

12. The assembly as claimed in claim 11, wherein the third projected central bore axes extend perpendicular to the fourth projected central bore axes.

13. The assembly as claimed in claim 1, wherein all of the sets of water dispensing bores include a same number of water dispensing bores.

14. The assembly as claimed in claim 1, wherein each water dispensing bore is oriented such that the central bore axis thereof is angled away from a corresponding bore opening transversal plane in which the outlet opening of the water dispensing bore is disposed and towards the outlet body end to allow the water dispensed through the water dispensing bores to urge the fresh concrete in the central passageway towards the outlet body end.

15. The assembly as claimed in claim 14, wherein at least one water dispensing bore is disposed such that the central bore axes thereof are angled away from the corresponding transversal plane at a longitudinal angle of about 15 degrees.

16. The assembly as claimed in claim 1, wherein each water dispensing bore is cylindrical and has a diameter of between 0.5 mm and 2.5 mm.

17. The assembly as claimed in claim 16, wherein each water dispensing bore has a diameter of between 0.600 mm and 0.650 mm.

18. The assembly as claimed in claim 1, wherein the body sidewall includes an outer wall and an inner wall coaxial to the outer wall and spaced radially inwardly therefrom to define an annular chamber therebetween, the annular chamber being in communication with the water inlet and with the first and second pluralities of water dispensing bores to allow water to be dispensed from the water inlet to all the water dispensing bores.

19. The assembly as claimed in claim 18, wherein the tubular body includes an inner tube defining the inner wall and an outer tube defining the outer wall, the inner tube being distinct from the outer tube and being axially insertable into the outer tube.

20. The assembly as claimed in claim 1, wherein the tubular body further includes a plurality of annular grooves defined in the inner face of the body sidewall and extending circumferentially around the central passageway, each annular groove extending in a corresponding bore opening transversal plane such that the outlet openings of the corresponding set of water dispensing bores disposed in the corresponding bore opening transversal plane are defined in the annular groove.

21. The assembly as claimed in claim 20, wherein each annular groove has a depth which is comprised between 0 mm and 5 mm.

22. The assembly as claimed in claim 20, wherein each annular groove has a rectangular cross-section.

23. The assembly as claimed in claim 20, wherein each water dispensing bore has a bore diameter, and each annular groove has a width which is between 1 to 10 times the bore diameter.

24. The assembly as claimed in claim 1, wherein the tubular body includes a concrete wetting section extending from the inlet body end towards the outlet body end and a stream controlling section extending from the concrete wetting section to the outlet body end, the water inlet and the water dispensing bores being defined in the concrete wetting section.

25. The assembly as claimed in claim 24, wherein the stream controlling section includes at least one helicoidal conduit defined within the body sidewall, each helicoidal conduit extending helicoidally around the central conduit between an air inlet end and an air outlet end coinciding with the outlet body end, the air inlet end being operatively connectable to a pressurized air source to force air through the helicoidal conduit, the helicoidal conduit being twisted around the central passageway to guide the pressurized air exiting through the air outlet end in an helicoidal airflow extending out from the outlet body end and twisting around the stream of fresh concrete exiting the outlet body end to thereby accelerate a plurality of fresh concrete particles located in an outer layer of the stream of fresh concrete.

26. The assembly as claimed in claim 1, further comprising a hose connector securable to a dry concrete ingredients dispensing hose operatively coupled to the concrete source, the tubular body including a nozzle inlet connecting portion located at the open inlet body end and connectable with the hose connector.

27. The assembly as claimed in claim 26, wherein the nozzle connecting portion includes a circumferential outer groove and wherein the hose connector includes a female cam fitting collar sized and shaped to be coaxially inserted over the nozzle inlet connecting portion, the female cam fitting collar including at least one pivotable cam member selectively movable between a locked position in which the at least one pivotable cam member engages the circumferential outer groove to prevent axial movement of the female cam fitting collar relative to the tubular body and an unlocked position in which the at least one pivotable cam member is clear from the circumferential outer groove to allow the female cam fitting collar to be removed from the tubular body.

28. A shotcrete nozzle assembly comprising:

a tubular body having an open inlet body end, an open outlet body end and a body sidewall defining a central passageway extending between the inlet and outlet body ends along a longitudinal passageway axis centrally positioned in the central passageway, the body sidewall having an inner face facing inwardly towards the central passageway, the inlet body end being operatively connectable to a concrete source for providing dry concrete ingredients into the central passageway, the tubular body including:

a concrete wetting section extending from the inlet body end towards the outlet body end, the concrete wetting section including:

a water inlet defined in the body sidewall, the water inlet being operatively connectable to a water source, the water inlet being in fluid communication with the central passageway to allow water to be dispensed from the water source into the central passageway to mix the dry concrete ingredients passing in the central passageway with water to form fresh concrete;

a plurality of water dispensing bores extending through the body sidewall between the water inlet and the central passageway to allow the water to be dispensed into the central passageway, each water dispensing bore defining an outlet opening in the inner face of the body sidewall, each water dispensing bore extending along a central bore axis, the plurality of water dispensing bores including:

a first set of water dispensing bores positioned such that the outlet openings thereof are spaced apart from each other and are disposed in a first bore opening transversal plane extending perpendicularly to the longitudinal passageway axis, the first set of water dispensing bores being oriented such that the central bore axes of at least a portion of the first set of water dispensing bores extend in a non-radial direction relative to the longitudinal passageway axis; and a second set of water dispensing bores positioned such that the outlet openings thereof are spaced apart from each other and are disposed in a second bore opening transversal plane spaced longitudinally from the first bore opening transversal plane and towards the outlet body end, the second set of water dispensing bores being oriented such that the central bore axes of at least a portion of the second set of water dispensing bores extend in a non-radial direction relative to the longitudinal passageway axis, and such that an orthogonal projection of the central bore axes of the first set of water dispensing bores onto one of the first and second bore opening transversal planes forms a plurality of first projected central bore axes and an orthogonal projection of the central bore axes of the second set of water dispensing bores onto the one of the first and second bore opening transversal planes forms a second plurality of projected central bore axes which intersect the first projected central bore axes at a first non-zero angle; and a stream controlling section extending from the concrete wetting section to the outlet body end, the stream controlling section including at least one helicoidal conduit defined within the body sidewall, each helicoidal conduit extending helicoidally around the central conduit between an air inlet end and an air outlet end coinciding with the outlet body end, the air inlet end being operatively connectable to a pressurized air source to force air through the helicoidal conduit, the helicoidal conduit being twisted around the central passageway to guide the pressurized air exiting through the air outlet end in an helicoidal airflow extending out from the outlet body end and twisting around the stream of fresh concrete exiting the outlet body end to thereby accelerate a plurality of fresh concrete particles located in an outer layer of the stream of fresh concrete.

29. A shotcrete nozzle assembly comprising:

a tubular body having an open inlet body end, an open outlet body end and a body sidewall defining a central passageway extending between the inlet and outlet body ends along a longitudinal passageway axis centrally positioned in the central passageway, the body sidewall having an inner face facing inwardly towards the central passageway, the inlet body end being operatively connectable to a concrete source for providing dry concrete ingredients into the central passageway, the tubular body including:

a water inlet defined in the body sidewall, the water inlet being operatively connectable to a water source, the water inlet being in fluid communication with the central passageway to allow water to be dispensed from the water source into the central passageway to mix the dry concrete ingredients passing in the central passageway with water to form fresh concrete; and a plurality of water dispensing bores extending through the body sidewall between the water inlet and the central passageway to allow the water to be dispensed into the central passageway, each water dispensing bore defining an outlet opening in the inner face of the body sidewall, each water dispensing bore extending along a central bore axis, the plurality of water dispensing bores including:

a first set of water dispensing bores positioned such that the outlet openings thereof are spaced apart from each other and are disposed in a first bore opening transversal plane extending perpendicularly to the longitudinal passageway axis, the first set of water dispensing bores being oriented such that the central bore axes of at least a portion of the first set of water dispensing bores extend in a non-radial direction relative to the longitudinal passageway axis; and a second set of water dispensing bores positioned such that the outlet openings thereof are spaced apart from each other and are disposed in a second bore opening transversal plane spaced longitudinally from the first bore opening transversal plane and towards the outlet body end, the second set of water dispensing bores being oriented such that the central bore axes of at least a portion of the second set of water dispensing bores extend in a non-radial direction relative to the longitudinal passageway axis, and such that an orthogonal projection of the central bore axes of the first set of water dispensing bores onto one of the first and second bore opening transversal planes forms a plurality of first projected central bore axes and an orthogonal projection of the central bore axes of the second set of water dispensing bores onto the one of the first and second bore opening transversal planes forms a second plurality of projected central bore axes which intersect the first projected central bore axes at a first non-zero angle; and a plurality of annular grooves defined in the inner face of the body sidewall and extending circumferentially around the central passageway, each annular groove extending in a corresponding bore opening transversal plane such that the outlet openings of the corresponding set of water dispensing bores disposed in the corresponding bore opening transversal plane are defined in the annular groove.

* * * * *